US012667819B2

(12) United States Patent
Macaluso et al.

(10) Patent No.: US 12,667,819 B2
(45) Date of Patent: Jun. 30, 2026

(54) ROCKER-STYLE LIQUID TREATMENT TANKS WITH INSTRUMENTATION

(71) Applicant: Morris & Associates, Inc., Garner, NC (US)

(72) Inventors: David H. Macaluso, Benson, NC (US); John P. Shell, Raleigh, NC (US); Kimberly L. Ingram, Goldsboro, NC (US); Bryan Joseph Johns, Clayton, NC (US)

(73) Assignee: Morris & Associates, Inc., Garner, NC (US)

( * ) Notice: Subject to any disclaimer, the term of this patent is extended or adjusted under 35 U.S.C. 154(b) by 952 days.

(21) Appl. No.: 17/867,732

(22) Filed: Jul. 19, 2022

(65) Prior Publication Data

US 2023/0025966 A1 Jan. 26, 2023

Related U.S. Application Data

(60) Provisional application No. 63/225,939, filed on Jul. 26, 2021.

(51) Int. Cl.

| | |
|---|---|
| ***B01F 35/00*** | (2022.01) |
| ***B01F 27/112*** | (2022.01) |
| ***B01F 35/21*** | (2022.01) |
| ***B01F 35/212*** | (2022.01) |
| ***B01F 35/221*** | (2022.01) |

(52) U.S. Cl.

CPC ........ *B01F 35/2212* (2022.01); *B01F 27/112* (2022.01); *B01F 35/2113* (2022.01); *B01F 35/212* (2022.01); *B01F 2215/044* (2013.01)

(58) Field of Classification Search

CPC ................ B01F 35/2212; B01F 35/212; B01F 35/2113; B01F 2215/044

See application file for complete search history.

(56) References Cited

U.S. PATENT DOCUMENTS

| | | | | |
|---|---|---|---|---|
| 2007/0251596 | A1* | 11/2007 | Scherzer | B01F 27/0722 366/132 |
| 2020/0245536 | A1* | 8/2020 | Erker | B01F 35/2212 |
| 2020/0245538 | A1* | 8/2020 | Turner | B01F 35/2209 |
| 2020/0245539 | A1* | 8/2020 | Stuart | B01F 35/2206 |

* cited by examiner

*Primary Examiner* — Anshu Bhatia

(74) *Attorney, Agent, or Firm* — Womble Bond Dickinson (US) LLP

(57) ABSTRACT

Disclosed are various embodiments of a rocker-style treatment tank equipped with instrumentation. In one embodiment, a rocker treatment tank includes a dasher configured to oscillate within treatment liquid in the rocker treatment tank. The dasher includes a dasher shaft, one or more dasher arms coupled to the dasher shaft, and at least one dasher blade coupled to the dasher arm(s). The rocker treatment tank also includes one or more sensors configured to provide data directly or indirectly indicating a torque transmitted to the dasher to effect oscillation.

20 Claims, 17 Drawing Sheets

ROCKER-STYLE LIQUID TREATMENT TANKS WITH INSTRUMENTATION

CROSS REFERENCE TO RELATED APPLICATIONS

This application claims priority to and the benefit of U.S. Provisional Application No. 63/225,939, filed on Jul. 26, 2021 and entitled "ROCKER-STYLE LIQUID TREATMENT TANKS WITH INSTRUMENTATION," which is hereby incorporated herein by reference in its entirety.

BACKGROUND

A rocker-style liquid treatment tank comprises a horizontal semi-cylindrical tank and a dasher extending from approximately the central axis of the tank to a distal edge proximate the inner tank wall. The tank is configured to contain a body of liquid (e.g., water) up to a liquid level, which liquid has properties such as temperature and/or chemical content suitable for the treatment intended for a product, such as poultry carcasses. For example, the liquid may be above, below, or at a certain temperature to warm, chill, or maintain the temperature of the product in various scenarios. Further, the liquid may contain a chemical disinfectant. In some examples, the temperature and chemical content may be selected to treat the product so as to reduce or inhibit microbial growth. In other examples, the liquid is used for cooking, brining, curing, marinating, or effecting other changes in the product.

Mechanical components are provided to oscillate the dasher back and forth about a longitudinal axis approximately collocated with the cylindrical axis of the tank. Such mechanical components may comprise motors, gears, linkages, linear or rotary actuators and/or related devices. The tank may further comprise an infeed component for loading product into the tank and an unloading component (unloader) as well as components for filling and draining treatment liquid from the tank. The unloader removes product from the tank by way of components such as rotary paddles (windmill style), belt conveyors or other components. The tank may be fitted with components that inject air or other fluids into the tank below the liquid level in the tank for the purpose of agitating the liquid in the tank and causing it to circulate about the product in the tank.

The product to be treated is fed into the tank at an inlet end and is immersed in the treatment liquid. The product is agitated within the liquid by the motion of the dasher and by circulation induced by the agitating fluid injection. The product is held within the tank for a period of time. The product is removed from the tank at an outlet end opposite the inlet end.

The treatment system may employ an external heat exchanger to alter the temperature of treatment liquid in the treatment tank. Typically, liquid is removed from one end of the tank and pumped through a heat exchanger where it is heated or chilled before being returned to a different area of the tank. In other embodiments, treatment liquid temperature is adjusted in situ by means such as heaters attached to the outside of the tank wall. Other approaches to temperature management may be used in other embodiments.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a rocker-style treatment tank that contains instrumentation to optimize treatment objectives. Conventional rocker-style treatment tanks lack this instrumentation and are entirely manually controlled, generally by experienced operators who have a heuristic feel for how best to operate the system. Unfortunately, even experienced operators may mistakenly ignore or fail fully to consider various operational parameters or may simply be distracted by other duties and responsibilities. In some cases, experienced operators may be unavailable, and novice operators may improperly or sub-optimally operate the treatment tank. Accordingly, manual operation may lead to non-optimal product throughput, inadequate product treatment, damage to product, damage to the treatment tank or associated systems, or even potential operator injury. As will be described, the instrumentation includes monitoring devices and control devices that can be used to optimize the operation of the rocker-style treatment tank and provide for improved throughput and better treatment of the product.

Figure 1:
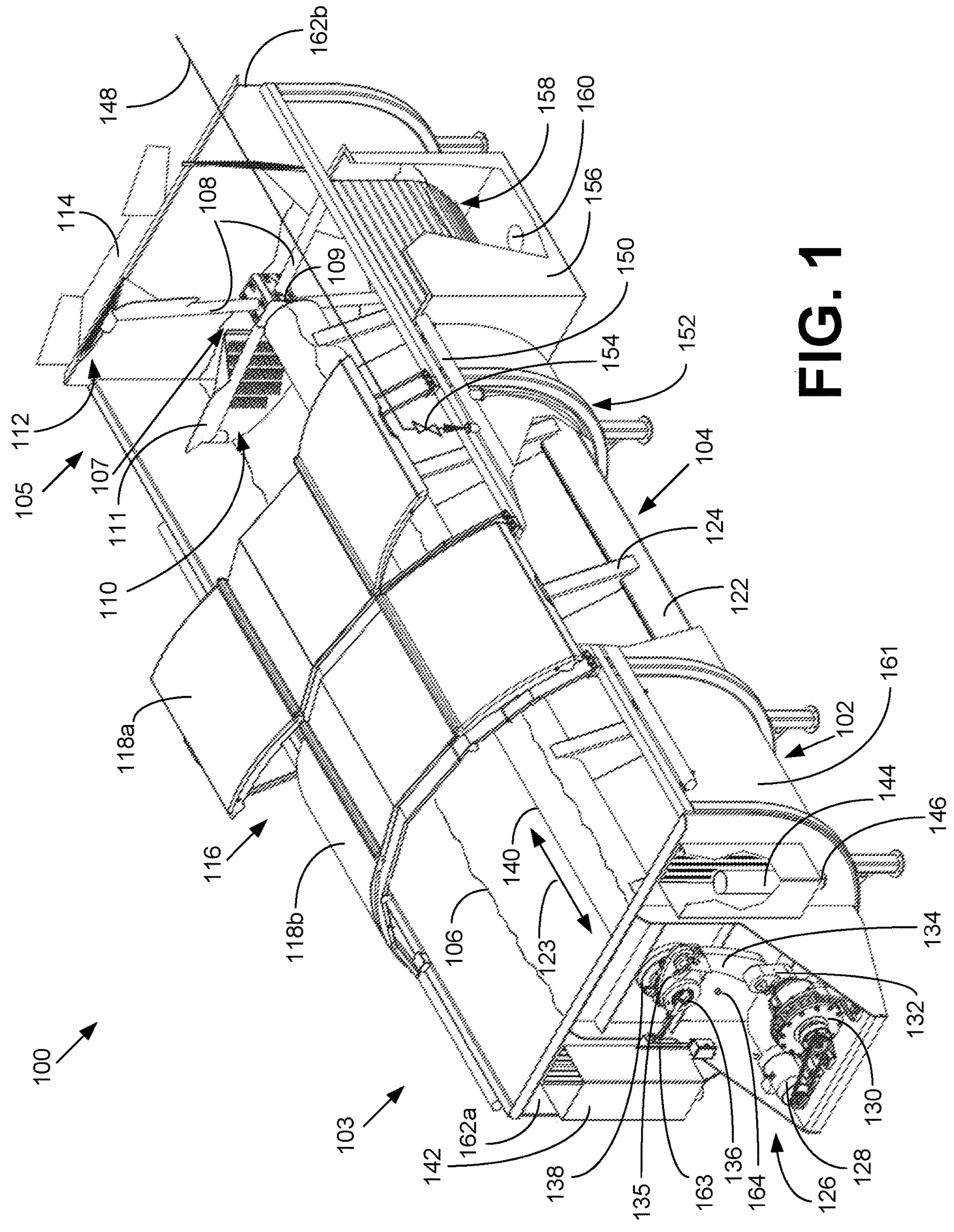
FIG. 1 is a perspective view of a rocker treatment tank configured to adjust the temperature and increase the moisture content of product according to various embodiments.

Referring now in more detail to the drawings, in which like numerals indicate like parts throughout the several views, FIG. 1 is a perspective view of a rocker treatment tank 100 configured to treat products, such as eviscerated poultry carcasses, meat, fish, packages of products (e.g., soup packets, beans), and so on. The rocker treatment tank 100 generally includes a tank 102 and a dasher 104. The tank 102 is configured to hold a body of treatment liquid 106, such as water that may include other chemicals compatible for reducing microbial contamination of the product. Product is introduced into an inlet end 103 of the tank 102, is treated (e.g., temperature adjusted) by the treatment liquid 106 and may have contaminants neutralized before being removed from the outlet end 105 of the tank 102 by way of the unloader arms 108 rotating about the unloader hub 109, which causes the unloader paddle 111 to rise from the lifting position at 110 to the unloading position 112. The product is then deposited on the discharge chute 114. The tank 102 may have a tank cover system 116. The tank cover system 116 may have one or more access hoods 118 that may be in an open position at 118*a* or in a closed position at 118*b*.

The system may remove treatment liquid 106 from the outlet end 105 of the tank 102 through suction port 160, adjust its temperature or other parameters, and reintroduce the treatment liquid 106 into the tank 102 at the inlet end 103. In other embodiments, the treatment liquid 106 may be returned over the side of the tank 102 or through a port below the liquid level of the tank 102. The removal of product and treatment liquid 106 at the outlet end 105 of the tank 102 and the continued addition of product at the inlet end 103 of the tank creates a general flow from the inlet end 103 of the tank 102 to the outlet end 105. However, it is noted that there may be interruptions to product inflow and outflow in the operation of the rocker treatment tank 100.

As the product migrates toward the outlet end, the dasher 104 oscillates a dasher blade 122 about a longitudinal axis 123 transversely through the tank 102, by way of the dasher arms 124 stirring the product to effect exposure to treatment liquid. The dasher drive 126 includes a motor 128 that operates a reducer 130, which in turn actuates a drive arm 132 and a crank arm 134, which rotates a lever arm 135 connected to a drive shaft 136 that rotates in a bearing 138 to turn the dasher shaft 140 that is connected to the dasher arms 124 and the dasher blade 122. Overflow boxes 142 are positioned on the left and/or right sides of the tank 102 to catch treatment liquid 106 that overflows via a standpipe 144, and which is removed via the overflow drain 146.

An air supply pipe 148 supplies pressurized air via an air distribution header 150 to a plurality of air hoses 152 that introduce air into the tank 102 to agitate the contents. The air is controlled by way of the agitation flow control valve 154. A suction box 156 houses a suction grate 158 and a suction outlet 160 that is used to remove the treatment liquid 106 from the outlet end 105 of the tank 102.

The tank 102 is generally formed from an elongated longitudinal wall 161. The longitudinal wall 161 has a curved bottom portion. In the illustrated embodiment, the longitudinal wall 161 is substantially U-shaped, including the curved bottom portion and upwardly extending parallel portions that increase the height of the tank 102 along the sides. In other embodiments, the longitudinal wall 161 may be approximately semi-cylindrical. Enclosing the longitudinal wall 161 at its edges are an end wall 162*a* at the inlet end 103 of the tank 102, and an end wall 162*b* at the outlet end 105 of the tank 102. A longitudinal axis 123 extends between the end walls 162 and from the inlet end 103 to the outlet end 105 of the tank 102. In the illustrated embodiment, the end walls 162 are substantially parallel to each other, although other configurations are possible.

The tank 102 can have a variety of shapes, sizes, and volumes, and can be formed from a variety of materials. In one non-limiting example, the tank 102 may have a length between about 20 feet and about 35 feet, a width between about 8 feet and 12 feet, and a height between about 6 and 10 feet. In such an example, a capacity of the tank 102 may be between about 200 and 450 gallons per linear foot. In other examples, a length of the tank 102 may be between about 2 and 40 feet, and a width of the tank 102 may be between about 1 and 12 feet. An example of a material that can be used to form the walls of the tank 102 is stainless steel. However, other materials and shapes can be used.

The tank 102 may be instrumented with a rotation sensor 163 to monitor and sense the rotation and oscillation of the dasher 104. The tank 102 may also be instrumented with a low level sensor 164 positioned at a height at which the corresponding treatment liquid level may not be sufficient to properly suspend the product in the treatment liquid 106. Problems that may occur due to a low level of the treatment liquid 106 may include inadequate treatment of the product, damage to the product, damage to the dasher 104 or other components of the rocker treatment tank 100, improper unloading of the product, and so forth.

In some embodiments, the tank 102 is configured so that the force of gravity influences the movement of the product from the inlet end to the outlet end. For example, the longitudinal wall 161 of the tank 102 may tilt slightly downward toward the outlet end. Alternatively, a plurality of adjustable leveling feet that support the tank 102 can be adjusted so that the outlet end 105 is slightly lower than the inlet end 103.

The addition of product into the inlet end 103 of the tank 102, along with the removal of treatment liquid 106 and product from the outlet end 105 of the tank 102, creates a general flow or current from the inlet end 103 to the outlet end 105. In some embodiments, additional circulation is created to aid the movement of product in the tank 102. (See FIG. 6.) The product can slowly migrate on this current toward the outlet end 105, where an unloader 107 lifts product to the discharge chute 114 which in turn delivers the product to, for example, a conveyor. In some embodiments, water jets mounted in the inlet end wall 162*a* impinge on product in the tank 102 and push the product toward the outlet end 105.

While a variety of assemblies could be employed, in the illustrated embodiment the unloader 107 is a rotating windmill-type assembly having an unloader hub 109, radiating arms 108 and unloader paddles 111 all adjacent the end wall 162*b* at the outlet end 105. A drive (see FIG. 5) couples to the hub 109 by an unloader shaft penetrating the outlet end wall 162*b* and rotates the unloader 107 about a longitudinal axis 123 of the tank 102. As the windmill rotates, the product collects between the unloader paddles 111 and the end wall 162*b*. The paddles 111 slope slightly toward the end wall 162*b* so that once the product is positioned on a paddle 111, continued rotation of the unloader 107 lifts the product from the treatment liquid 106.

To promote the exposure of the product to treatment liquid 106, the rocker treatment tank 100 includes the dasher 104. The dasher 104 comprises the dasher shaft 140 aligned with the longitudinal axis 123 of the tank 102 and extending between the end walls, dasher arms 124 extending radially from the dasher shaft 140 at intermittent positions along the length of the dasher shaft 140 and an elongated dasher blade 122 supported at the distal ends of the dasher arms 124.

Figure 2:
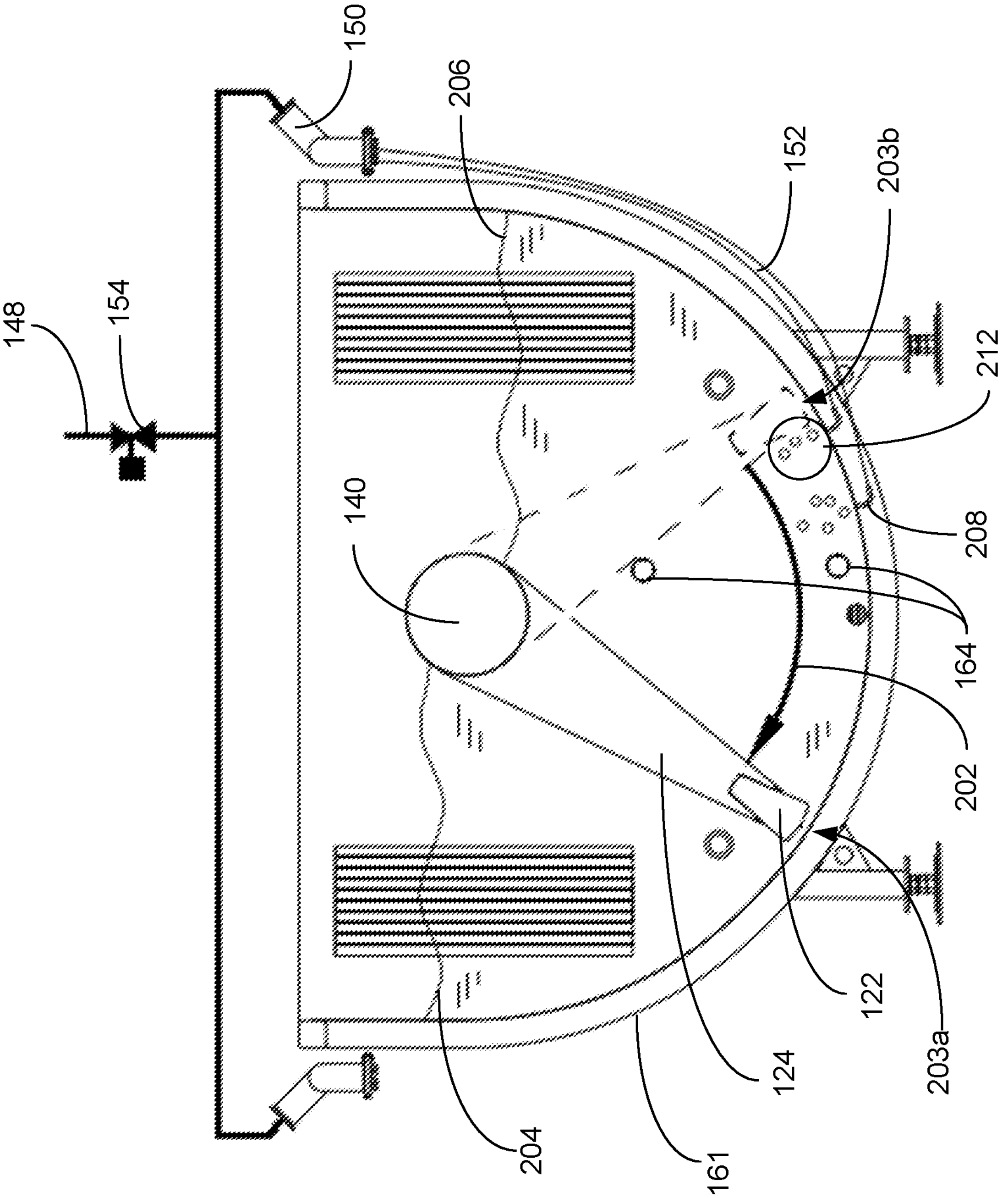
FIG. 2 is a sectional view of the rocker treatment tank of FIG. 1 looking toward the inlet end.

FIG. 2 is a sectional view of the rocker treatment tank 100 looking toward the inlet end 103. As shown in FIG. 2, the dasher arms 124 are sized to extend from the dasher shaft 140 to the concave inner surface of the longitudinal wall 161 of the tank 102, so that the dasher blade 122 is positioned closely adjacent the concave longitudinal wall 161. The dasher blade 122 increases in width with increased distance from the dasher shaft 140, so that each face of the dasher blade 122 forms an obtuse angle with the longitudinal wall 161.

As shown in FIG. 1, the dasher 104 is coupled to a motor 128 for oscillating the dasher 104 in the tank 102. The motor 128 may be an electric motor, hydraulic motor or other device that imparts the motion to the dasher 104.

As shown in FIG. 2, the dasher 104 oscillates along a path that follows the curved bottom portion of the tank 102. In embodiments in which the curved bottom portion is substantially semi-cylindrical, the dasher 104 oscillates through an arc 202 of, for example, about 30 degrees to about 90 degrees. Starting from a vertical (centered) position, an upward reach of the dasher 104 to a first terminal position **203*a* of the arc 202 is about 15 degrees to about 45 degrees from the vertical position in the counterclockwise direction. The upward reach of the dasher 104 to a second terminal position 203*b* of the arc 202 is about 15 degrees to about 45 degrees from the vertical position in the clockwise direction. Preferably, the amplitude of the arc 202 is such that the dasher 104 remains below the liquid level throughout the oscillation, avoiding the likelihood of the dasher 104 elevating the product out of the treatment liquid 106 as it rocks back and forth along the arc 202. In motion, the dasher 104 sweeps from a vertical position toward the first terminal position 203*a* of the arc 202, reverses course, and sweeps in the reverse direction to the second terminal position 203*b* of the arc 202, and again reverses course to again pass through the vertical position thus completing one cycle. Therefore, the terminal positions 203 are on opposite sides of the tank 102. The level of the treatment liquid 106 is shown both at a level 204 ahead of the dasher 104 as it sweeps in a clockwise direction as indicated by arc 202, and at a lower level 206 on the back side of the sweep of the dasher 104. When the direction of dasher movement reverses to a counterclockwise direction, the relative water level 206 on the first side of the tank 102 will rise while the level 204 on the second side of the tank falls to a lower level. The tank 102 may be instrumented with a plurality of liquid level sensors 164 at differing heights to sense the current level of the treatment liquid 106 in the tank 102**.

The oscillation of the dasher 104 urges the product upwardly and laterally, facilitating exposure of the treatment liquid 106 to the product. For example, because the product is usually relatively denser than the treatment liquid 106 in which it is submerged, the product is disposed to slowly sink in the tank 102. The rocking of the dasher 104 stirs the product, levitating the product up into the treatment liquid 106 from the bottom to assure thorough contact with the treatment liquid 106. The momentum imparted on the product allows it to remain temporarily suspended in the relatively more turbulent treatment liquid 106 before again sinking toward the bottom. The oscillation of the dasher 104 tends to break up clusters of the product to create a relatively uniform distribution of product within the tank 102, and promotes treatment by continually replacing the treatment liquid 106 adjacent the product.

The movement of the dasher 104 may be relatively slow. For example, the dasher 104 may take about 3 seconds to about 30 seconds to perform a single cycle oscillating from the first terminal position **203*a* to the second terminal position 203*b* and back. The slow movement of the dasher 104 gently massages the product and moves the product so that particulate units of the product gently bumps against and separate from one another. The product also gently bumps against the dasher blade 122 and the longitudinal wall 161. Bruising and damaging is reduced by the shape of the dasher blade 122, which forms the obtuse angle with the surface of the longitudinal wall 161, so that product passing adjacent the dasher blade 122 is gently tumbled away from the longitudinal wall 161 instead of getting caught or pushed into the longitudinal wall 161. At the terminal positions 203 of each sweep through the arc 202, the motion of the dasher 104** may pause as the direction of travel is reversed.

Although the dasher 104 is described above as having a specific configuration, a person of skill would appreciate that the dasher 104 can have other configurations in other embodiments. For example, several dasher arms 124 and paddles could be used. Additionally, the rocker treatment tank 100 could include multiple different dashers 104 supported on different dasher shafts 140 and driven by different motor configurations. The motor 128 could be otherwise positioned, including positions in which the motor 128 is mounted overhead, and the motor 128 could oscillate the dasher 104 through an arc 202 having larger or smaller ranges of amplitudes. In some embodiments, the dasher 104 may continuously rotate about the dasher shaft 140 instead of oscillating. In such embodiments, the dasher 104 may have multiple sets of dasher arms 124 extending radially outward from the dasher shaft 140 in multiple directions, each set of dasher arms 124 supporting a different dasher blade 122. For example, the dasher 104 may be X-shaped when viewed from the end walls. Because the dasher 104 has multiple dasher blades 122 in such embodiments, the product is continually stirred even when the dasher blade 122 is elevated above the liquid level. In still other embodiments, the dasher blade 122 may not form the obtuse angle with the longitudinal wall 161, or the dasher arms 124 may be sized so that the dasher blade 122 is spaced apart from the longitudinal wall 161. In such embodiments, the product passes between the dasher blade 122 and the longitudinal wall 161 with relative ease, without getting trapped or damaged.

Because the dasher 104 pivots about the longitudinally extending axle, the dasher 104 oscillates upwardly and laterally. Therefore, the dasher 104 urges the product both upwardly and laterally, but does not urge the product axially, meaning parallel to longitudinal axis 123 of the tank 102 from the inlet end 103 to the outlet end 105.

The rocker treatment tank 100 may include a plurality of agitation flow nozzles 208 coupled to the air hoses 152, which are fed by the air header 150. The agitation flow control valve 154 may regulate the amount of air and/or pressure delivered to the agitation flow nozzles 208. The agitation flow nozzles 208 introduce rapidly rising air bubbles 212 into the treatment liquid 106. The air bubbles tend to disturb the product and to create turbulence in the treatment liquid 106 surrounding the product, enhancing heat transfer between the product and the treatment liquid 106. The agitation flow nozzles 208 are positioned through the longitudinal wall 161 of the tank 102 at intervals along the length of the tank 102. Each interval may include several agitation flow nozzles 208 that are spaced apart around the curved bottom portion.

Figure 3:
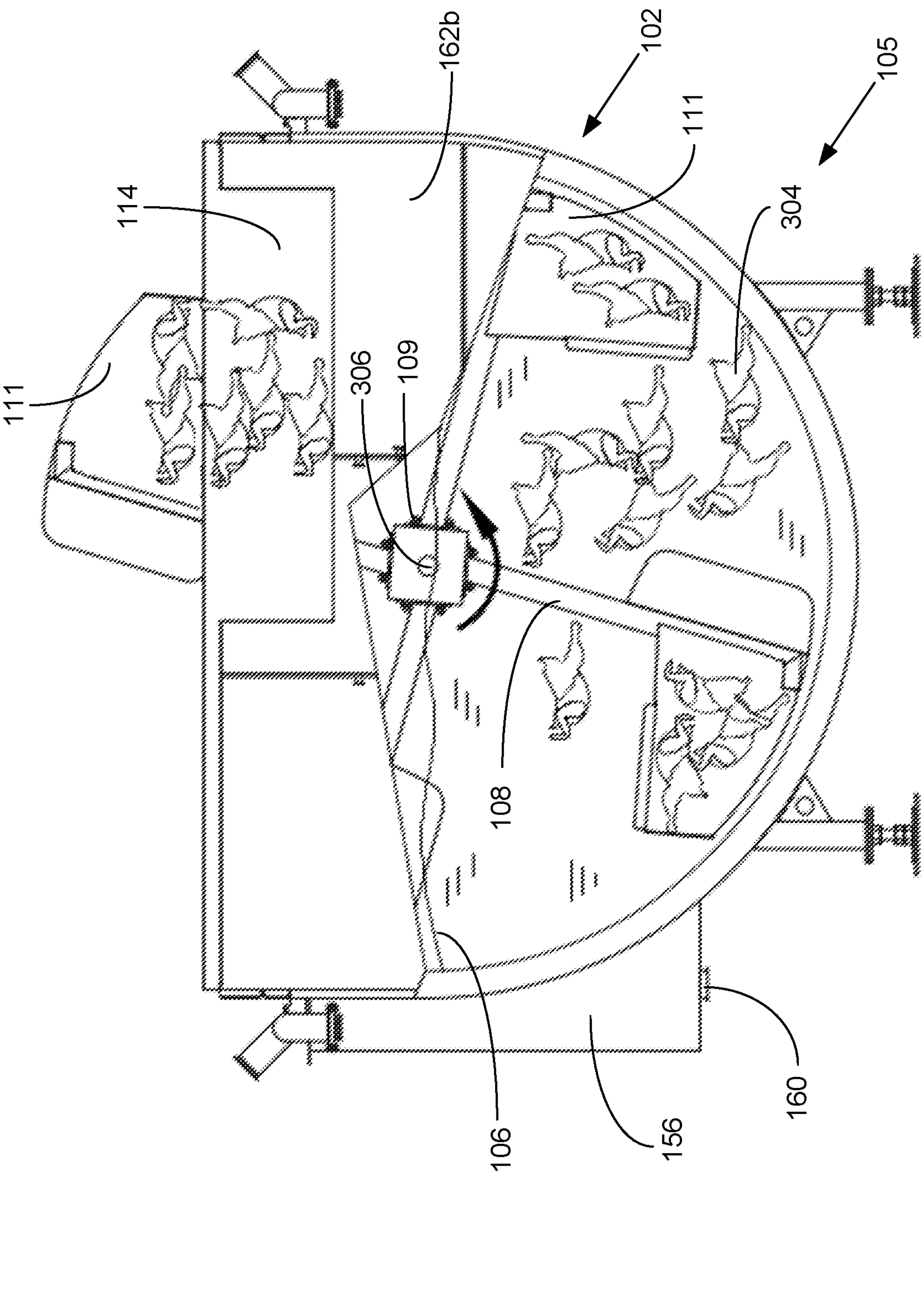
FIG. 3 is an outlet end view of the rocker treatment tank of FIG. 1 in which some elements have been partially or completely removed to more clearly illustrate operation of the unloader.

FIG. 3 is an outlet end 105 view of the rocker treatment tank 100 in which some elements (as shown in more detail in FIG. 5) have been partially or completely removed to more clearly illustrate operation of the unloader 107. The outlet end wall 162*b* is partially shown in FIG. 3, with the operation of the unloader paddle 111 being demonstrated in a cut away view, showing how product 304 is lifted out of the tank 102 by way of the unloader paddle 111 at the unloading position 112 and then deposited into the discharge chute 114. The unloader 107 is rotated by means of an unloader shaft 306 connected to the unloader hub 109.

Figure 4:
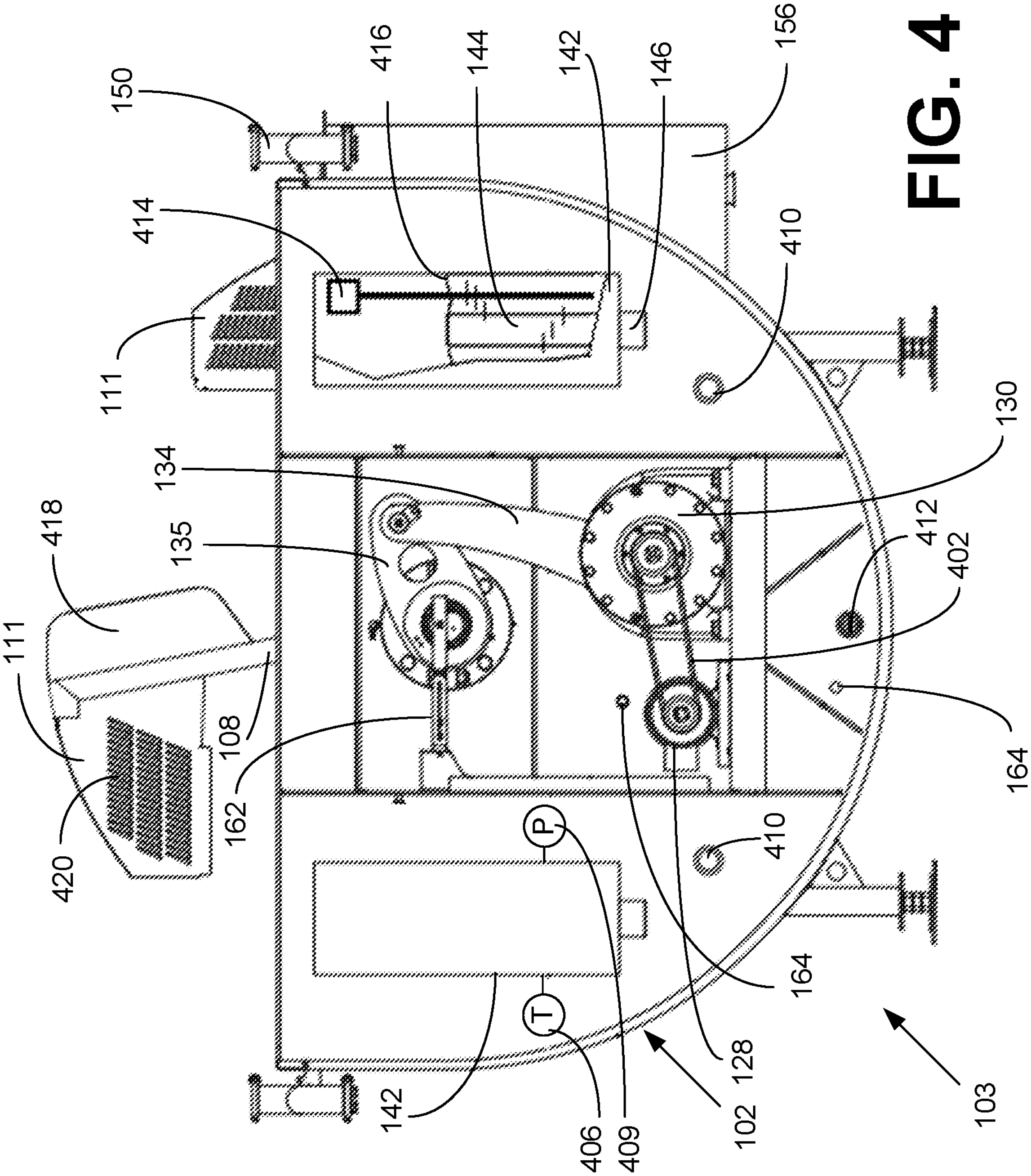
FIG. 4 illustrates the inlet end of the rocker treatment tank of FIG. 1 in additional detail.

FIG. 4 illustrates the inlet end 103 of the rocker treatment tank 100 in additional detail. Additional detail shown in FIG. 4 includes a drive belt 402 that is operated by the motor 128 in order to actuate the dasher speed reducer 130. The overflow box 142 may be instrumented with a treatment liquid temperature sensor 406 and a pressure sensor 409, where the pressure measurement from the pressure sensor 409 may be indicative of the liquid level in the tank 102. One or more propulsion ports 410 may be provided to receive liquid to assist in urging the product axially in the tank 102. A drain port 412 may be provided in order to drain the tank 102. A level sensor 414 senses the current liquid level 416 in the overflow box 142, which may be relative to the overflow standpipe 144. For example, the level sensor 414 may be a single-point sensor such as a float switch or an analog level measurement such as an ultrasonic sonar type sensor. The unloader paddle 111 may include a scoop 418 to direct product to the unloader paddle 111, and the unloader paddle 111 may include a plurality of perforations 420 that are used to drain the treatment liquid 106 away from the product.

Figure 5:
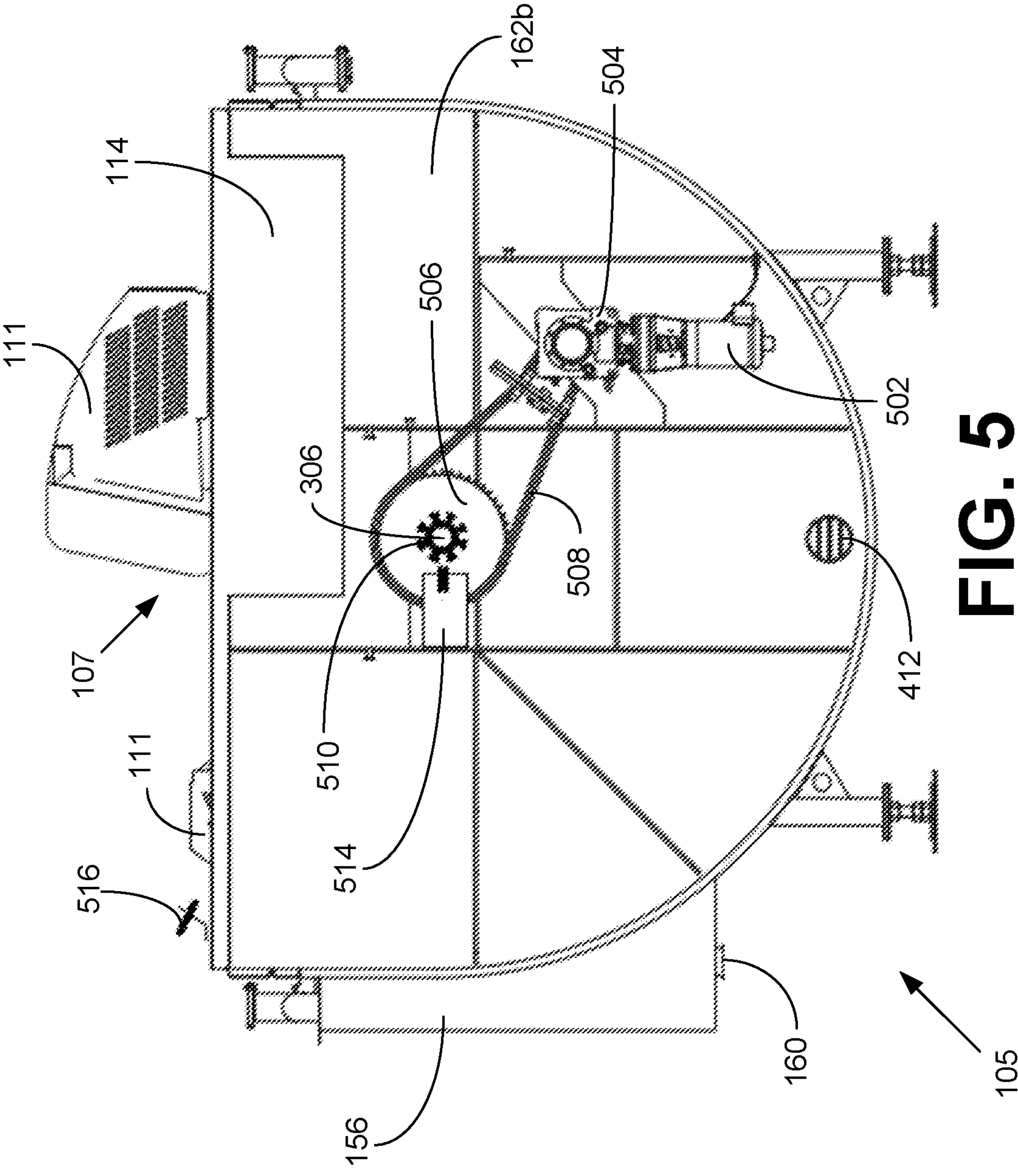
FIG. 5 is an outlet end view of the rocker treatment tank of FIG. 1 with additional detail as compared to the outlet end view of FIG. 3.

FIG. 5 is an outlet end 105 view of the rocker treatment tank 100 with additional detail as compared to FIG. 3. In particular, the unloader drive motor 502 operates the unloader speed reducer 504, which drives the unloader sprocket 506 by way of a drive chain 508 (or belt). The unloader sprocket 506 in turn operates the unloader shaft 306. A rotation sensor 514 may be provided in order to monitor the unloader rotation by way of the rotation of the cogged disk 510 attached to the unloader shaft 306. A paddle proximity sensor 516 may be used to sense the passing of unloader paddles 111 as the unloader 107 rotates. Another drain port 412 is also shown.

Figure 6:
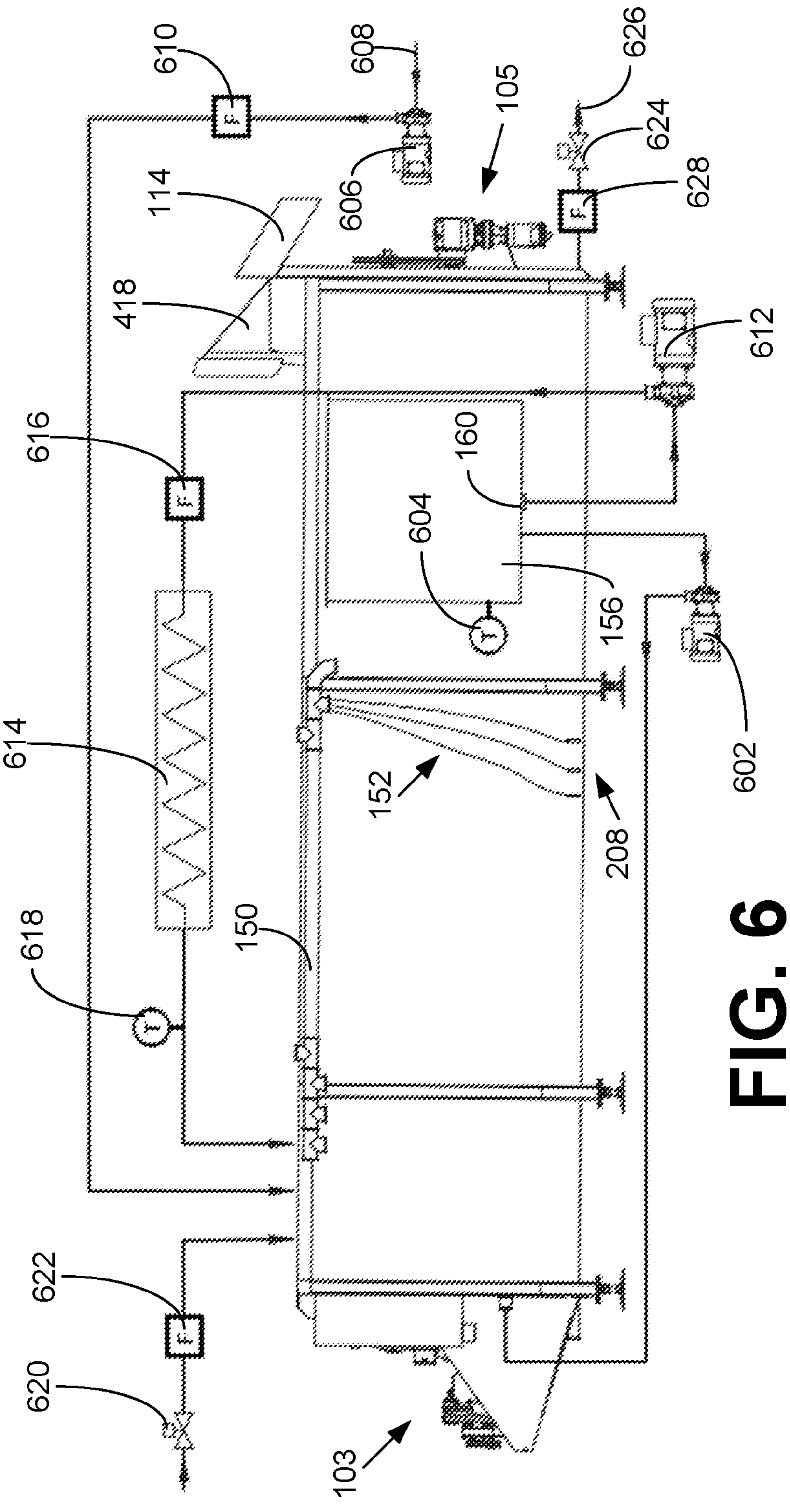
FIG. 6 is a longitudinal side view of the rocker treatment tank of FIG. 1 with ancillary components.

FIG. 6 is a longitudinal side view of the rocker treatment tank 100 with ancillary components. A propulsion pump 602 receives treatment liquid 106 from the suction box 156 and transfers it to the propulsion port(s) 410. A temperature sensor 604 may be provided on or in the suction box 156 to sense the liquid temperature in the suction box 156. A transfer pump 606 may be provided to transfer treatment liquid 106 from a downstream tank via line 608 into the tank 102, and a flow monitor 610 may monitor the rate and/or pressure of this flow. A circulation pump 612 may transfer treatment liquid 106 from the suction port 160 of the suction box 156 to a heat exchanger 614 where the liquid is heated or cooled. A flow monitor 616 may monitor the rate and/or pressure of this flow, and a temperature sensor 618 may monitor the controlled temperature of the liquid output from the heat exchanger 614. A liquid supply valve 620, which may be a manually operated or electrically operated valve, controls the admission of fresh treatment liquid 106 into the tank 102, and a flow monitor 622 may monitor the rate and/or pressure of this flow. A drain valve 624, which may be a manually operated or electrically operated valve, controls the disposal of liquid to a waste line 626. A flow monitor 628 may monitor the rate and/or pressure of this flow.

Figure 7A:
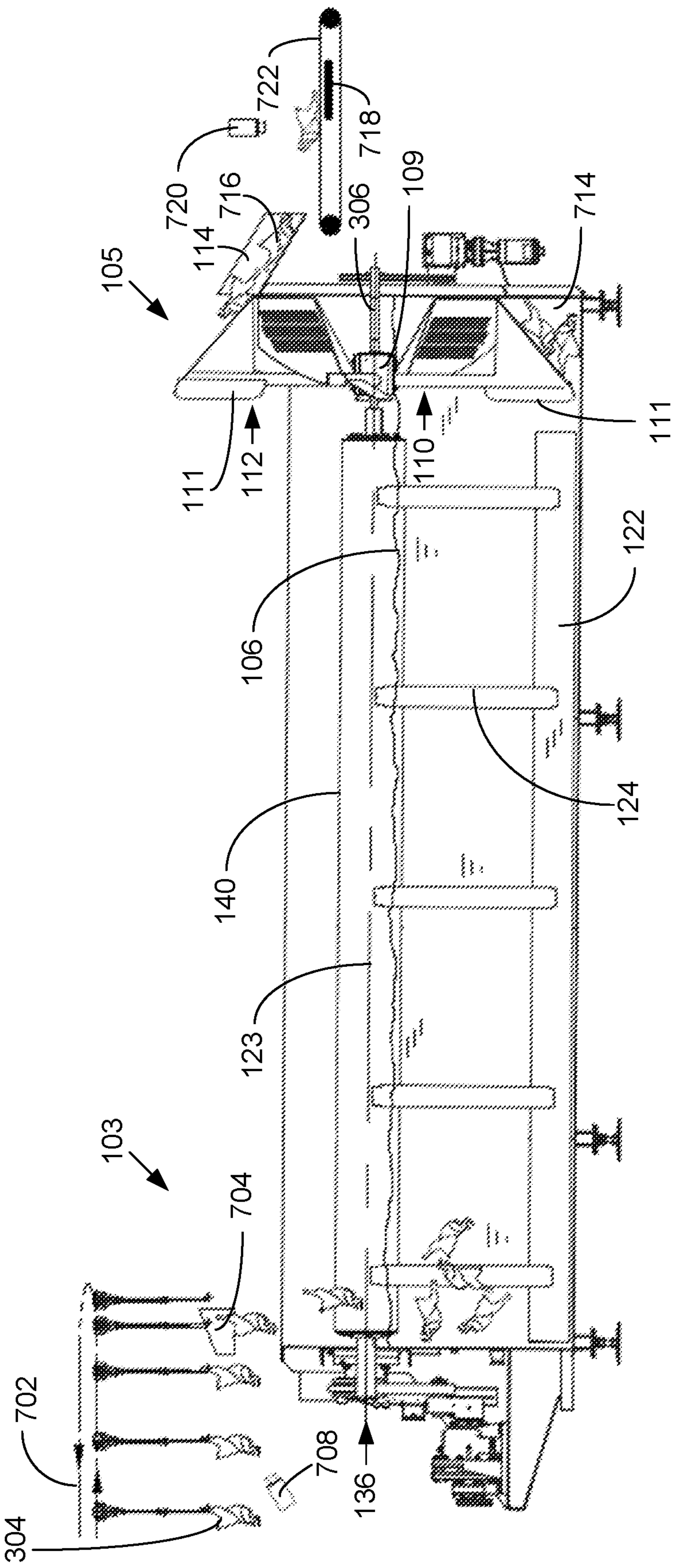
FIG. 7A is a longitudinal section view of the rocker treatment tank of FIG. 1 illustrating the operation of the rocker treatment tank of FIG. 1.

FIG. 7A is a longitudinal section view of the rocker treatment tank 100 illustrating the operation of the rocker treatment tank 100. In this non-limiting example, the product 304 arrives on a shackle line 702 and is dismounted from the shackle line 702 by way of a product dismount device 704 and deposited into the tank 102 at the product inlet end 103. Examples of alternatives to the shackle line 702 for delivery of the product may include belts, chutes, sluice troughs, pipe, and so on. The product 304 may be counted by an optical counter 708. The dasher shaft 140 is rotated along the axis 123, moving the dasher arms 124 and the dasher blade 122 back and forth.

The product 304 ultimately arrives at the product discharge end 105 and is lifted out of the tank 102 by the unloader paddles 111, which spin with the unloader shaft 306. The area 714 shows a volume of product captured by the unloader paddle 111 that is then lifted out of the tank 102. The product 304 is lifted out of the tank 102 and deposited into the discharge chute 114, where it falls out of the chute at 716 and onto a product discharge conveyor 722. The unloader paddles 111 can rotate, causing a rotation action that can move the product, and ultimately lift the product 304 from a lifting position 110 to an unloading position 112. The lifting position 110 can include where the arms and/or the unloader paddles 111 are positioned or at an angle under a horizontal plane and under the unloader shaft 306. The unloading position 112 can include where the arms and/or the unloader paddles 111 are positioned or at an angle over a horizontal plane and over the unloader shaft 306. This unloading position 112 can also be proximate to discharge chute 114. An infrared temperature sensor 720 may capture the temperature of the product 304 at this time, after it has been heat adjusted by the rocker treatment tank 100. A belt scale 718 may include a load cell in the conveyor 722 to measure the weight of the product 304.

Figure 7B:
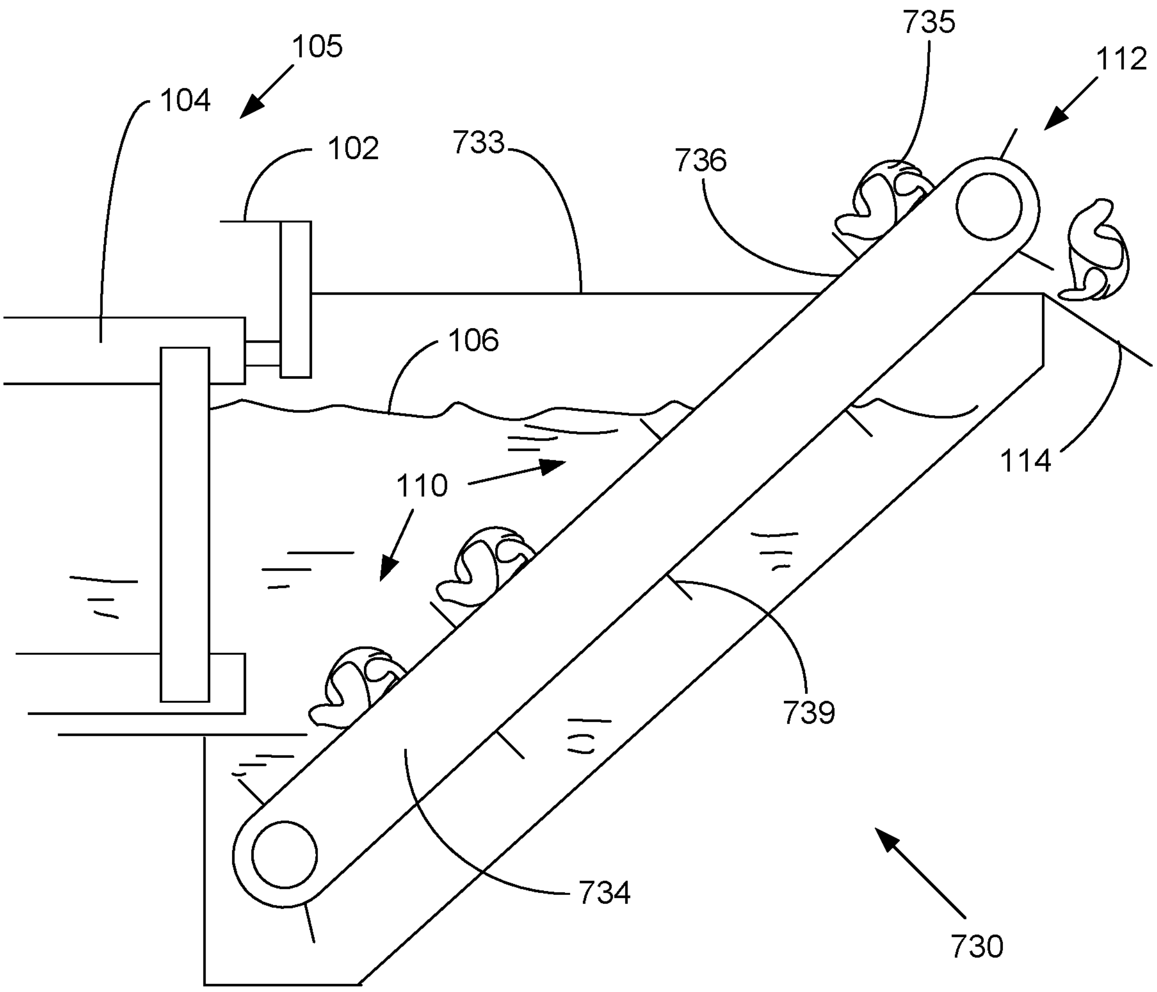
FIG. 7B is a section view of a belt unloader used in alternative embodiments of the rocker treatment tank of FIG. 1.

FIG. 7B is a section view of a belt unloader 730 used in alternative embodiments of the rocker treatment tank 100. The belt unloader 730 may be used in place of the windmill-type unloader 107 shown in FIG. 1. In this example, product migrates out the outlet end 105 of the tank 102 by the oscillating movement of the dasher 104 into a compartment 733 that houses a conveyor assembly 734. Product 735 settles on the belt 736 of the conveyor assembly 734 and is lifted out of the treatment liquid 106 from a lifting position 110 to an unloading position 112 where it can be deposited onto a discharge chute 114 or possibly another conveyor. The lifting position 110 can include a position some distance below a top of the compartment 733. The unloading position 112 can be proximate to the discharge chute 114, proximate to another conveyor, or otherwise at or above the top of the compartment 733.

Cleats 739 (transverse ribs) attached to the belt 736 keep the product 735 from sliding down the incline of the belt 736. In alternative embodiments, the conveyor assembly 734 can be turned 90 degrees from the orientation shown. In another embodiment, a pump unloader is used that propels the product through a discharge passage to a location outside the tank 102. In yet another embodiment, a rotating picker may be used as an unloader.

Figure 8:
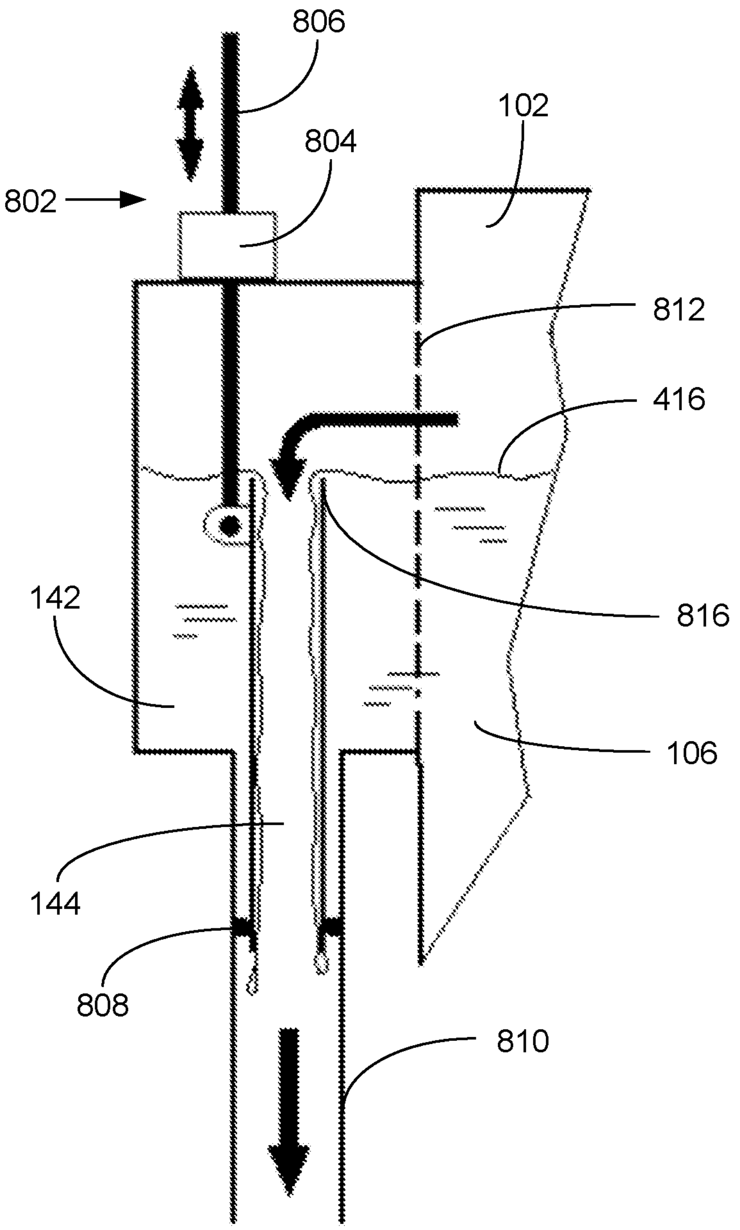
FIG. 8 illustrates a section view of an adjustable weir used in the overflow box of the rocker treatment tank of FIG. 1 according to various embodiments.

FIG. 8 illustrates a section view of an adjustable weir used in the overflow box 142. A linear actuator 802 may include a power unit 804 that moves a lead screw 806 up and down as desired, which in turn moves the standpipe 144 up and down in the overflow box 142. A seal 808 impounds the liquid from exiting the overflow box 142 via the drain pipe 810, yet allows the standpipe 144 to move up and down. A grate 812 is used to separate the product from the overflow box 142, yet allowing the treatment liquid 106 to pass through. When the liquid level 416 exceeds the upper edge 816 of the standpipe 144, the treatment liquid 106 exits down the drain pipe 810.

In alternate embodiments, the adjustable weir may comprise a moveable weir plate (not shown) installed in a track adjacent an opening in a wall of the tank 102 or overflow box or suction box 156. A sliding seal prevents liquid in the tank from flowing between the plate and tank wall. The assembly is configured so that liquid from the tank or overflow box can flow over an upper edge of the weir and out of the treatment tank. Thus, the height of the upper edge determines the level of liquid in the treatment tank. A linear actuator moves the plate up and down to adjust the liquid level in the treatment tank 102.

Figure 9:
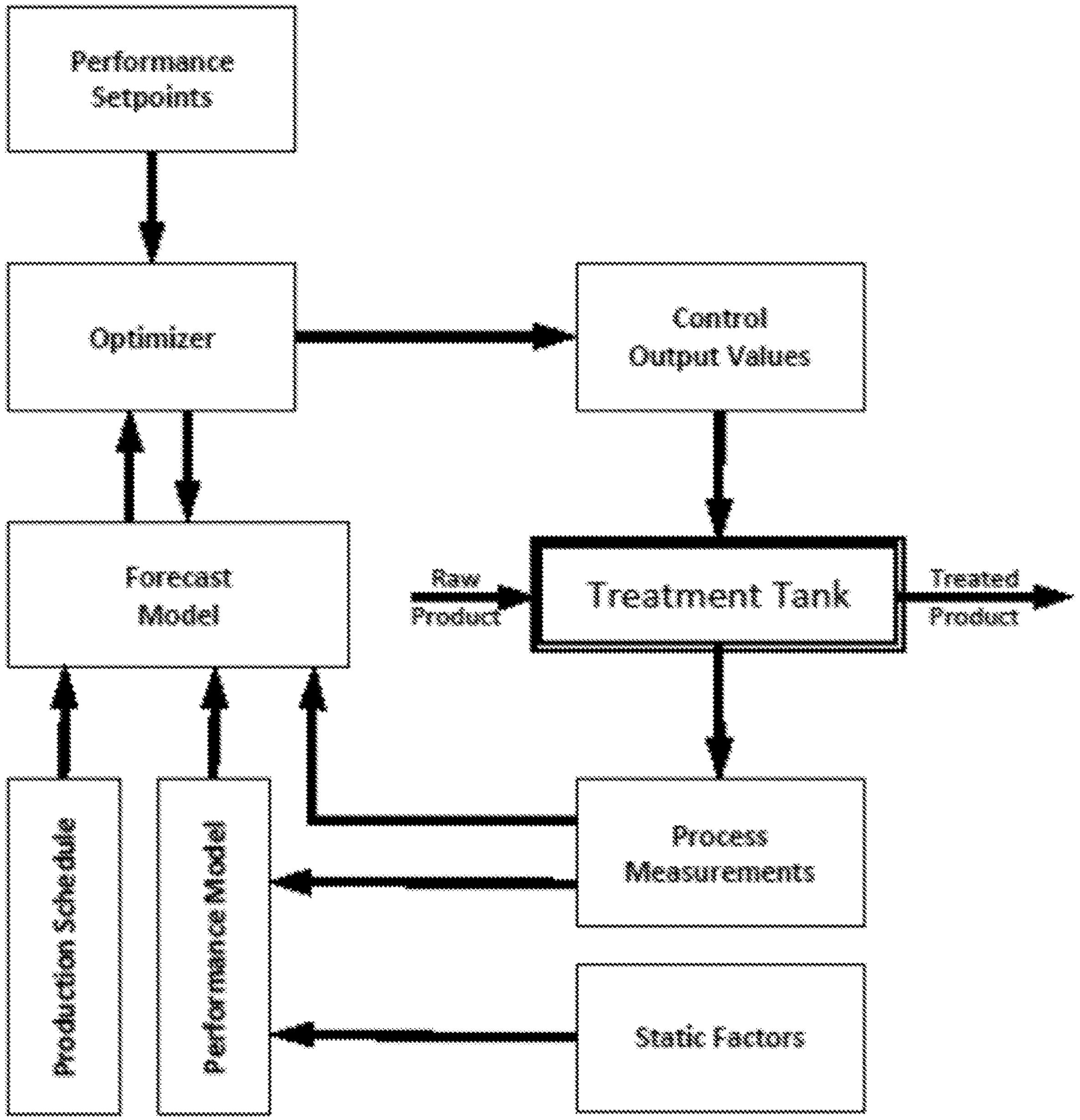
FIGS. 9 and 10 are drawings illustrating examples of relationships among parameters and their potential use in controlling the rocker treatment tank of FIG. 1.
Figure 10:
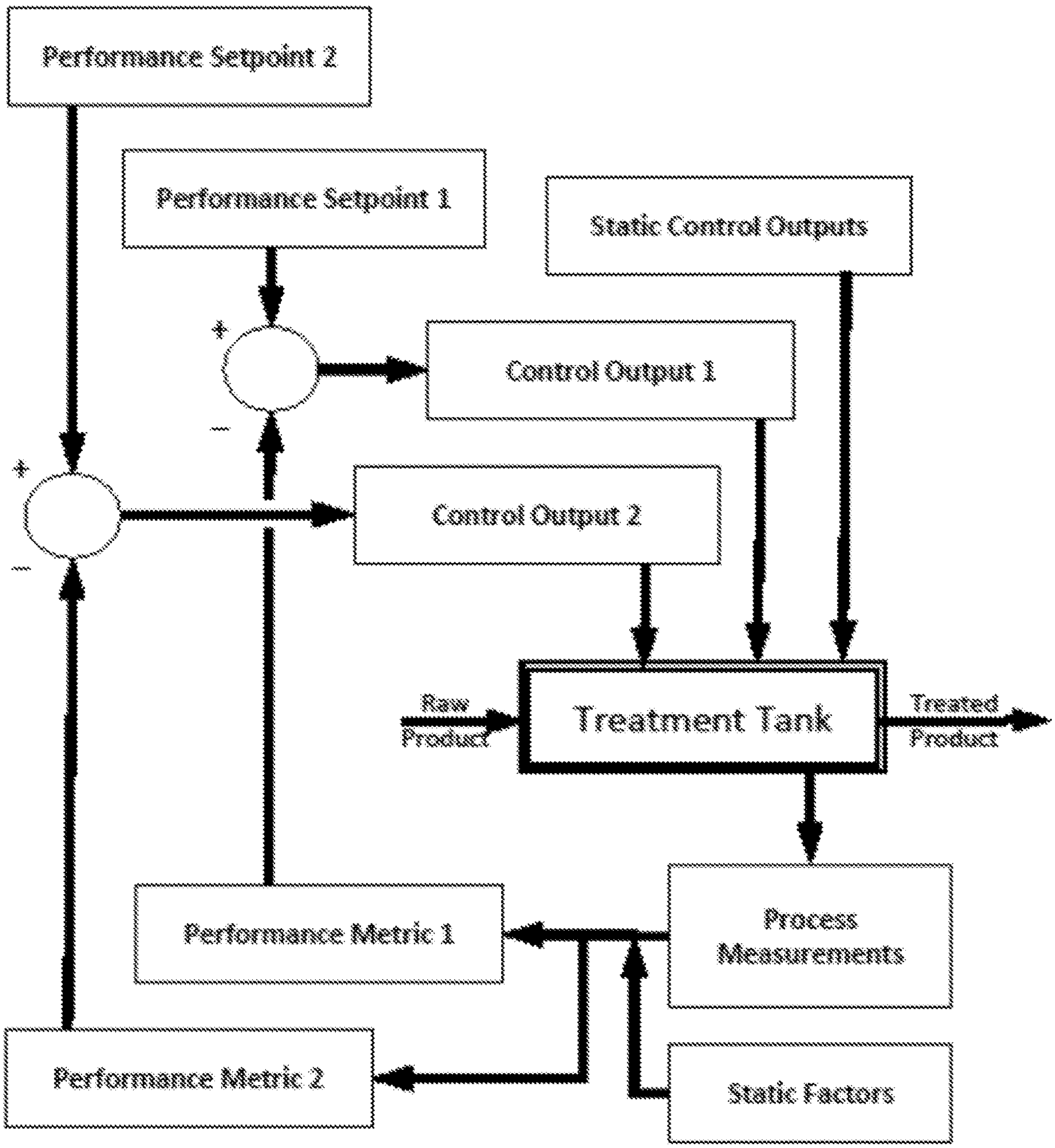

A set of parameters can be defined that characterize the condition of the treatment tank and the product being treated. These parameters can be broadly categorized as performance metrics, control outputs, process measurements, static factors and derivatives. These categories and individual parameters are further explained herein. The relationships among these parameters and their potential use in controlling the treatment tank are illustrated in FIGS. 9 and 10.

A set of performance metrics defines and quantifies the processor's objectives in treating the product. Examples of performance metrics might include unloading rate, product temperature and product yield, where yield is defined as the weight of the finished product divided by the initial weight. For example, the processor might have an objective of delivering a certain quantity of product each minute to the next processing step downstream of the treatment tank with scheduled breaks in delivery in order to maintain the overall production schedule for the facility. The applicable performance metric would be unloading rate (i.e., the rate at which the unloader removes product from the rocker treatment tank 100). These and other possible metrics are further described herein. The processor arbitrarily sets performance setpoints (i.e., desired values for performance metrics) which setpoints may change over the course of operations as represented in FIG. 9.

The rocker treatment tank 100 includes one or more physical control elements such as pumps, valves, etc. that can be adjusted to alter operation of the rocker treatment tank 100. A controller generates control outputs that are communicated to control elements to regulate operation of the respective element. Some control outputs have analog values (e.g., motor speed, weir height) while others may be discrete (e.g., on/off, open/closed). Control outputs can generally be assigned arbitrary values within a range of allowed values. Some or all control outputs may be under optimized control meaning that the control algorithm dynamically adjusts the value of such parameters as treatment conditions evolve. The remaining control outputs may be under manual control or static control meaning that the control algorithm sets the control output to a particular value at the start of operations but does not continuously adjust the value as treatment conditions evolve.

The objective of automated control is to set the optimized control outputs to values that cause performance metrics to conform most closely to the established performance setpoints. FIG. 9 shows an optimizer algorithm setting the control output values that should provide the best treatment performance. The optimizer works iteratively with a forecast model of the treatment system to select control output values. Herein, the optimizer and forecast model are collectively referred to as a controller. Typically, the control output values will be applied for a fixed amount of time referred to as a time step before being updated for subsequent time steps.

The forecast model is an algorithm that uses parameter values from the current condition of the treatment tank along with trial control outputs from the optimizer to estimate the future condition of the treatment tank and product for the next one or more time steps. The estimate includes forecast values for performance metrics.

At each time step, the optimizer generates multiple sets of trial values for the control outputs and sends them to the forecast model which returns forecast values of the performance metrics. The set of control outputs that generate performance metric values that best match the performance setpoints is selected for use in the next time step.

Some of the parameters used to represent the current condition can be measured directly and are represented in FIG. 9 by the box labeled "process measurements." Other parameters—referred to as derivatives—may be difficult to measure directly but can be calculated or estimated from process measurements. The algorithms for generating derivatives are represented in FIG. 9 by the box labeled "performance model."

The box labeled "static factors" in FIG. 9 represents parameters that do not change or change infrequently but are nonetheless useful for calculating derivatives and performance metrics. For example, the liquid holding capacity of the particular treatment tank in use as a function of liquid level is useful in calculating certain derivatives and performance metrics. Such static factors may be entered by the operator as the need arises.

The box labeled "production schedule" in FIG. 9 represents the possibility that the production schedule for the processing facility can be used to improve the accuracy of the forecast model. For example, the production schedule may call for product to be loaded into the treatment tank at a particular rate over a particular time period after which no product will be loaded for the next time interval. Factoring such information into the forecast would reduce forecast error around the time of such transitions. Schedule information may be entered manually by an operator or transferred from an information network in the facility.

In some applications, acceptable treatment performance may be achieved with a significantly reduced set of optimized control outputs. For example, forecast model predictions for performance metrics product internal temperature, yield and unloading rate may be dominated by the derivative parameter product loading density to the extent that all other factors can be ignored. In such situations, the optimizer and forecast model algorithm may be reduced to a simple set of feedback functions to set control outputs for drain flow and unloader speed based on product loading density. In some embodiments, the feedback functions may be PID control loops. In some embodiments, control of drain flow may be achieved by adjusting the height of an overflow weir. Other control outputs including makeup flow, dasher speed, liquid temperature, etc. may be manually or automatically adjusted on a relatively infrequent basis such as hourly, daily or at need.

FIG. 10 represents a system in which two optimized control outputs are controlled by independent feedback loops based on respective performance metrics. More or less than two feedback loops may be employed as desired for the particular application in question. Effectively, the optimizer and forecast model of FIG. 9 have been simplified to an alternate controller comprising a set of one or more feedback control loops. As noted earlier, there may be additional control elements that are controlled statically. Further comparison with FIG. 9 shows that optimized control outputs and performance setpoints are illustrated individually. Performance metrics are illustrated explicitly. Note that performance setpoints are specific values of their respective metrics and may vary over time.

As alluded above, the performance metrics employed for the simplified system may be different than those suggested in the discussion of FIG. 9. While parameters such as product internal temperature and yield are still of primary interest to the processor, certain derivative parameters such as product loading density can be used as a proxy for those primary metrics. Each performance metric of FIG. 10 may be a process measurement or any derivative constructed or extrapolated from measurements or a primary performance metric of interest to the processor provided that the value of the parameter used is separable from the influence of other control outputs. Said another way, the value of each performance metric of FIG. 10 must be relatively independent of control outputs other than the one it is looped with. Specific combinations of performance metrics and control outputs are discussed further herein.

The circle elements of FIG. 10 represent control algorithms. These algorithms may be any variant of a PID control loop or a predictive control algorithm or any other type of single-output control algorithm. Various categories of parameters and individual parameters are described in more detail below, providing quantities of interest for optimizing product treatment.

The preferred mathematic formula to be used for each of the functions described herein is dependent on the details of each application. Consequently, the method described allows a practitioner to determine by experimentation as well as by deterministic principles the preferred form of functions to be used in controlling the treatment process. Indeed, the control algorithm may benefit from periodic or continual feedback to calibrate these formulae.

Figure 11:
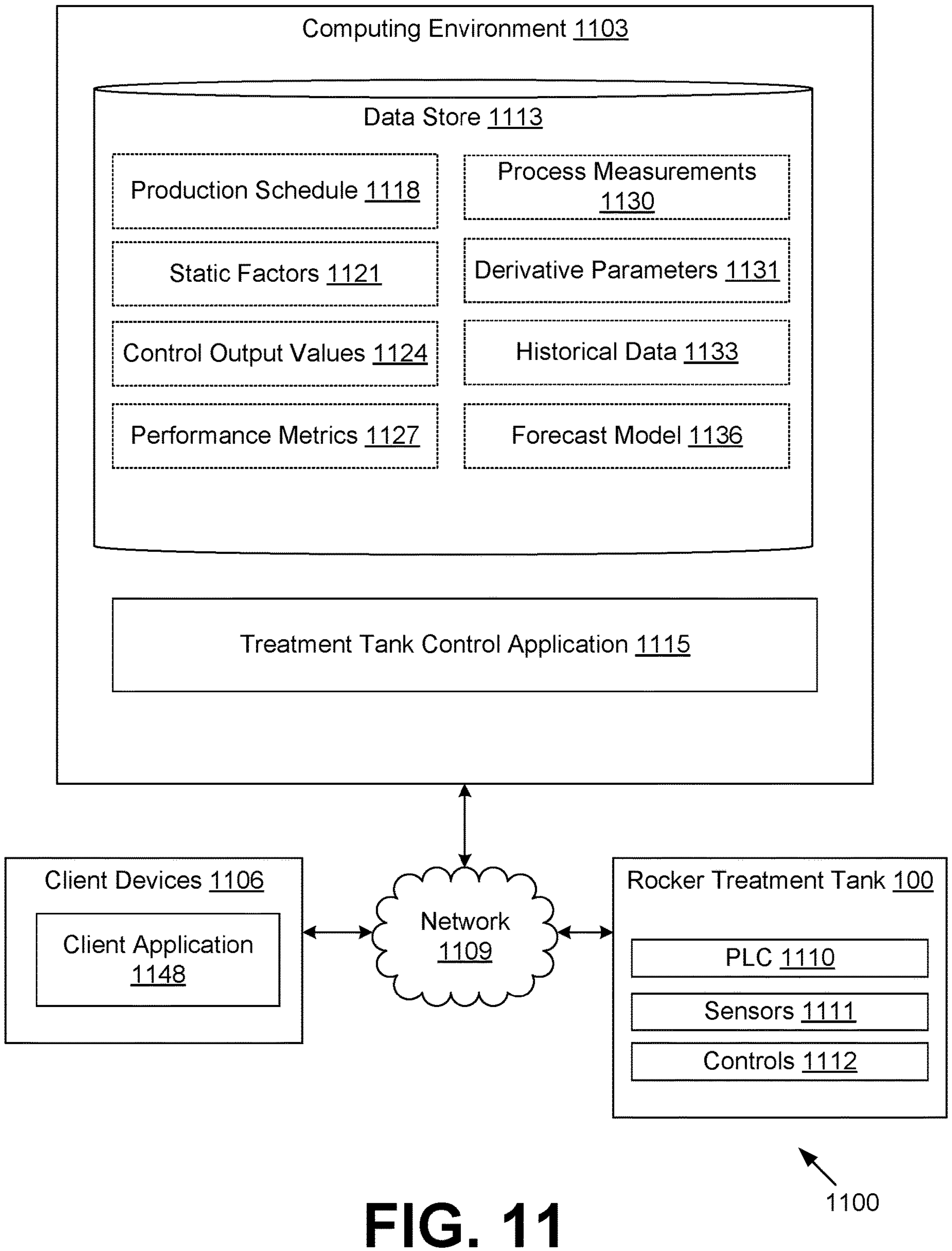
FIG. 11 is a schematic block diagram of a networked environment according to various embodiments of the present disclosure.

With reference to FIG. 11, shown is a networked environment 1100 according to various embodiments. The networked environment 1100 includes a computing environment 1103, one or more client devices 1106, and one or more rocker treatment tanks 100, which may be in data communication with each other via a network 1109. The network 1109 includes, for example, the Internet, intranets, extranets, wide area networks (WANs), local area networks (LANs), wired networks, wireless networks, cable networks, satellite networks, or other suitable networks, etc., or any combination of two or more such networks. The rocker treatment tanks 100 are instrumented as described with a programmable logic controller (PLC) 1110 that is connected to a plurality of sensors 1111 and a plurality of controls 1112. In other examples, the rocker treatment tanks 100 may include a computing device such as a server computer, embedded computing system, and so on, directly connected to the sensors 1111 and the controls 1112.

The computing environment 1103 may comprise, for example, a server computer, a PLC, an embedded computing device, or any other system providing computing capability. Alternatively, the computing environment 1103 may employ a plurality of computing devices that may be arranged, for example, in one or more server banks or computer banks or other arrangements. Such computing devices may be located in a single installation or may be distributed among many different geographical locations. For example, the computing environment 1103 may include a plurality of computing devices that together may comprise a hosted computing resource, a grid computing resource, and/or any other distributed computing arrangement. In some cases, the computing environment 1103 may correspond to an elastic computing resource where the allotted capacity of processing, network, storage, or other computing-related resources may vary over time.

Various applications and/or other functionality may be executed in the computing environment 1103 according to various embodiments. Also, various data is stored in a data store 1113 that is accessible to the computing environment 1103. The data store 1113 may be representative of a plurality of data stores 1113 as can be appreciated. The data stored in the data store 1113, for example, is associated with the operation of the various applications and/or functional entities described below.

The components executed on the computing environment 1103, for example, include a treatment tank control application 1115 and other applications, services, processes, systems, engines, or functionality not discussed in detail herein. The treatment tank control application 1115 is executed to manage and optimize the operation of the rocker treatment tank 100 that has been instrumented with the sensors 1111 and the controls 1112. For example, the treatment tank control application 1115 may implement a Supervisory Control and Data Acquisition (SCADA) system in conjunction with the PLC 1110, where the client devices 1116 do not have direct access to sensors 1111 and controls 1112.

The data stored in the data store 1113 includes, for example, a production schedule 1118, one or more static factors 1121, one or more control output values 1124, one or more performance metrics 1127, one or more process measurements 1130, one or more derivative parameters 1131, historical data 1133, one or more forecast models 1136, and potentially other data.

The production schedule 1118 includes data describing a schedule for delivery of raw product to the rocker treatment tank 100 and delivery of treated product to further processing operations downstream of the treatment tank including scheduled interruptions (breaks) and changes in rate of delivery. The production schedule 1118 may also include scheduled changes in product properties, which may affect the type of treatment to be provided in the rocker treatment tank 100. For example, larger product may require longer treatment times, while smaller product may require shorter treatment times. The production schedule 1118 may also document the availability of manual operators to intervene and make manual adjustments.

The static factors 1121 correspond to factors important to precise control of the rocker treatment tank 100 but which do not change appreciably during the course of daily operation. However, these factors may vary widely from one application to another, and such variation may alter the form of mathematical expressions used to characterize some of the dynamic factors and functions disclosed herein. The physical size and shape of the rocker treatment tank 100 will influence the way product responds to treatment processes and informs the preferred control algorithms. The rocker treatment tank 100 may be characterized by internal length, width or diameter, maximum depth, dasher length, extent of dasher motion in its oscillations, extent of open area in the dasher 104 and the presence of features to modify product flow within the rocker treatment tank 100.

Changes in the composition of treatment liquid 106 may change the viscosity of the liquid or the friction coefficient between the product and tank 102 surfaces. Such changes can skew the dynamics of the rocker treatment tank 100. A treatment liquid composition correction factor ($C_c$) may be applied to compensate for periodic alteration of the treatment liquid recipe. Values for the correction factor may be determined experimentally and cataloged for various treatment liquid 106 recipes.

The static factors 1121 may also include product characteristics, such as unit weight, specific gravity of the product, thermal conductivity of the product, and so on. The unit weight corresponds to the mass of an individual units or pieces of product. The specific gravity of the product determines whether product sinks, floats or is neutrally buoyant in the treatment liquid 106. The thermal conductivity of the product affects how long it takes to add or remove heat from the interior of product units.

The control output values 1124 corresponds to values set for the operation of the controls 1112 of the rocker treatment tank 100. Non-limiting examples of control output values 1124 may include dasher speed, unloader speed, makeup liquid flow, transfer liquid flow, drain flow, agitation fluid flow, controlled liquid temperature, propulsion pump controls, circulation pump controls, and so forth.

The dasher speed ($S_d$) is typically expressed in strokes per minute where a stroke is movement of the dasher 104 from the first terminal position 203*a* to the second terminal position 203*b* or vice versa. The control algorithm may use other quantities such as power frequency (Hertz) fed to the dasher drive motor as a proxy for dasher speed. Controls 1112 for controlling dasher speed may comprise a variable frequency drive (VFD) for the dasher motor 128, a variable speed reducer or transmission or other mechanisms.

The unloader speed ($S_u$) is typically expressed in batches per minute, where a batch might be a quantity of product lifted by one paddle of a windmill style unloader or the quantity of product lifted by one cleat on an inclined belt. The control algorithm may use other quantities such as power frequency (Hertz) fed to the unloader drive motor as a proxy for unloader speed. The quantity of product in each batch may be relatively independent from the unloader speed. The batch quantity may vary significantly in response to conditions such as product loading density in the tank 102, which may be defined as product inventory in the tank 102 divided by the geometric volume occupied by treatment liquid 106 and product in the tank 102. Consequently, unloader speed may partially determine the unloading rate. (See Equation 4 below). Components for controlling unloader speed may comprise a variable frequency drive (VFD) for the unloader drive motor 502, a variable speed reducer or transmission or other mechanisms.

The makeup liquid flow ($F_m$) may have an analog value expressed in units of volume/time such as gallons per minute. However, the flow rate may only rarely be controlled to any value other than zero (no flow) or maximum available flow (wide open). Consequently, the algorithm may treat makeup flow as a binary value (i.e., on or off). For example, the liquid supply valve 620 may be opened or closed to control the flow of makeup liquid to the treatment tank 102.

Components for controlling flow may comprise a liquid supply valve 620 in the liquid makeup line, control of power to a liquid supply pump (not shown) or other components. A makeup liquid flow control valve may be a solenoid valve, a motorized valve or other type of controllable valve. Components for monitoring flow may comprise a flow switch installed in the makeup water line, a flow meter such as a paddle wheel flow meter, a pressure sensor downstream of the flow control valve or other components. Flow may be inferred in some implementations by simply monitoring the status of the flow control valve.

Transfer liquid flow ($F_t$) is another control output value 1124. In some embodiments, the rocker treatment tank 100 will unload product into subsequent treatment tanks for further processing. In such embodiments, the downstream treatment tank may have a liquid transfer mechanism such as a pump 606 or sluice (not shown) to transfer treatment liquid from the downstream tank to the upstream treatment tank 102. Such transfer liquid flow can be treated much like makeup liquid flow to the upstream tank. Components for monitoring and controlling transfer liquid flow are similar to those for makeup liquid flow.

Drain flow ($F_d$) may have an analog value expressed in units similar to makeup liquid flow. However, the flow rate may only rarely be controlled to any value other than zero or maximum available flow. Consequently, the algorithm may treat makeup flow as a binary value (i.e., on or off). For example, a drain valve 624 may be open or closed. Components for monitoring and controlling drain liquid flow are similar to those for makeup liquid flow.

In some embodiments, the rocker treatment tank 100 may be fitted with an overflow weir having adjustable height (H) as shown in FIG. 8. The height of the weir can be adjusted to regulate drain flow proportionate to the tank liquid level 416 relative to the upper edge 816 of the weir. As illustrated in FIG. 8, the adjustable weir may comprise an adjustable standpipe 144 mounted in a drain pipe 810 with a sliding seal 808 between the two. A linear actuator 802 may be used to adjust the height of the standpipe. The assembly will preferably be installed in an overflow box 142 on the rocker treatment tank 100 or other location where a grate 812 will separate the weir from buffeting by the product. The linear actuator 802 may be a lead screw 806 (as illustrated), a pneumatic cylinder, a hydraulic cylinder, a rack and pinion or functional equivalent. The linear actuator 802 may be fitted with an encoder to report the position of the standpipe 144 to the control system.

The agitation fluid flow ($F_a$) may also be controlled. In some treatment tanks, a fluid such as air bubbles 212 or treatment liquid is injected below the liquid level as illustrated in FIG. 2 to agitate or stir the treatment liquid and enhance contact with the product. Agitation flow will have an analog value expressed in units of volume/time such as cubic feet per minute. In some embodiments, agitation flow will be controlled as a continuous variable. In other embodiments, the algorithm may treat agitation flow as a binary value (i.e., on or off). Means for monitoring and controlling agitation fluid flow are similar to those for makeup liquid flow. Where the fluid is air, control may be applied to a blower rather than a pump.

The controlled liquid temperature ($T_L$) may be reported. In embodiments wherein the treatment liquid 106 is circulated through an external heat exchanger 614, the functional settings of the heat exchanger 614 can be adjusted to control the temperature of liquid leaving the heat exchanger 614, for example as measured by a sensor 618, which will be the controlled liquid temperature. For embodiments in which the temperature of treatment liquid 106 is manipulated in situ, the liquid temperature at the coolest location of tanks 102 wherein the liquid is cooled or the warmest location of tanks 102 wherein the liquid is warmed, for example as measured by sensor 406 may serve as the controlled liquid temperature. Temperatures may be taken in other locations in other embodiments.

The propulsion pump 602 and the circulation pump 612 may also be controlled. These pumps may be turned off or on, or they may be operated at different speeds by a VFD.

Various performance metrics 1127 may be monitored by way of the sensors 1111 and optimized by way of the controls 1112. For example, performance metrics 1127 may include a treated product delivery schedule or unloading rate, a treated product internal temperature, a treated product yield, a product loading density, and/or other metrics. For simplified control systems, internal temperature and yield may be assumed to be met if the delivery schedule and the loading density are maintained.

The process measurements 1130 may include readings from the sensors 1111. For example, the process measurements 1130 may include a product infeed rate, a tank liquid temperature, a tank liquid level, dasher torque, unloader torque, makeup liquid temperature, dasher rotation, unloader rotation, product weight, product internal temperature, tank cover position, and so on.

The product infeed rate ($m_{in}$) may be expressed as mass/time. The control algorithm may use other quantities as a substitute for mass/time. For example, where most units (pieces) of product have a consistent mass, the rate at which units of product are added to the tank expressed as number of pieces/time may be used in place of mass/time. Infeed rate may be measured by weighing the product directly as with a belt scale for example. Piece rate of delivery may be measured using a proximity sensor to count product units as they pass a location on the shackle line feeding the treatment tank. Such a proximity sensor might comprise an optical device that changes state when a solid object breaks a light beam in front of the sensor. In other embodiments, alternative devices for weighing or counting product in motion toward the rocker treatment tank 100 may be used.

The tank liquid temperature ($T_t$) may be used to characterize the condition of treatment liquid 106 in the tank 102. It may be an average of measurements from several locations, or it may be the warmest or coldest temperature, or it may be the temperature measured at a single, consistent location. In some embodiments, it may be desirable to mount temperature sensors in locations where they are protected from buffeting by product in the tank 102. Examples of such locations include a suction box 156 or overflow box 142.

The treatment liquid level (L) in the treatment tank may be monitored. Typically, liquid level at any place in a rocker treatment tank 100 fluctuates as the liquid sloshes from side to side in response to the dasher 104 motion. As illustrated in FIG. 2, the level 204 ahead of the moving dasher 104 tends to be higher than the level 206 on the back side of the dasher 104. Consequently, a characteristic liquid level may be defined as the level at which the treatment liquid would settle were the dasher to stop. The characteristic level should be estimated in such a way as to be suitable for determining, in combination with dimensions of the rocker treatment tank 100, the geometric volume occupied by the treatment liquid 106 in the rocker treatment tank 100. The geometric volume may in turn be used for determining parameters such as the product loading density. This characteristic level may be estimated as an average of the level at one location in the tank over a full oscillation cycle of the dasher 104. Alternatively, averaging levels measured on opposite sides of the tank 102 simultaneously may provide a stable estimate of characteristic liquid level. For example, the average of levels measured in a left-side overflow box 142 and a right-side overflow box 142 may be averaged to provide a consistent indicator. Measurements made near the center of the tank 102 may experience less fluctuation than measurements made closer to the side walls. The level may be measured directly using the level sensor 414, for example, using a radar sensor, ultrasonic sensor, laser sensor, capacitive level sensor, or another type of sensor. Alternatively, the level may be measured indirectly using the level sensors 164, for example, using a pressure sensor or another type of sensor.

The dasher torque ($I_d$) corresponds to the torque required to move the dasher 104 through the treatment liquid 106 in the rocker treatment tank 100. The dasher torque may be measured directly—as with strain gauges on the dasher drive shaft 136 or the dasher shaft 140. The control algorithm may use other quantities such as drive motor current draw (Amps) or power (Watts) as a proxy for dasher torque. Parameters directly or indirectly indicating torque are referred to herein as torque-indicating parameters. Dasher torque will vary over the course of an oscillation cycle and reverse direction as the dasher motion reverses at the terminal positions 203. Peak torque may be different on the forward stroke (first terminal position 203*a* to second terminal position 203*b*) than on the reverse stroke. Consequently, a characteristic torque may be defined for use in control algorithms. Characteristic torque may be the peak torque value on the forward stroke. Alternatively, it may be the peak value on the reverse stroke or torque value as the dasher passes a vertical position or an average value over a stroke or some other representative value that may be measured or calculated and remains consistent over the course of treatment tank operations.

The unloader torque ($I_u$) corresponds to the torque required to move the unloader in lifting product out of the rocker treatment tank 100. The unloader torque may be measured directly—as with strain gauges on the unloader drive shaft. The control algorithm may use other quantities such as drive motor current draw (Amps) or power (Watts) as a proxy for unloader torque. Unloader torque may vary as the position of the unloader changes. Consequently, a characteristic unloader torque measured at a particular position may be established for use in the control algorithms. Another approach to measuring unloader torque is available for direct-drive configurations. In such a configuration, the speed reducer 504 mounts directly to the unloader shaft 306, which may eliminate the sprocket and chain assembly depicted in FIG. 5. An anti-rotation bar attached to the speed reducer 504 engages a fixed stop attached to the outlet end plate 162*b*. A load cell can then be interposed between the anti-rotation bar and the stop in order to measure the force of reaction against the stop, multiplied by the lever length to determine the torque.

The makeup liquid temperature ($T_m$) may be measured. Makeup liquid may come from a fresh supply source, or it may be transferred from a downstream treatment tank. In either case, the preferred method is to measure temperature as the liquid enters the rocker treatment tank 100.

A dasher rotation sensor 163 detects movement of the dasher drive shaft 136. Components for sensing movement may be Hall effect proximity switches adjacent to a cogged disk attached to the drive shaft or optical encoders, or other sensor types. The rotation sensor 163 can be used to verify appropriate operating speed for the dasher 104 and to diagnose mechanical problems such as broken belts 402.

An unloader rotation sensor 514 detects movement of the unloader shaft 306. Components for sensing movement may be Hall effect proximity switches adjacent to a cogged disk 510 attached to the drive shaft or optical encoders, or other sensors. The rotation sensor 514 can be used to verify appropriate operating speed for the unloader and to diagnose mechanical problems such as a broken chain 508. Alternatively, a proximity sensor 516 may be mounted on the upper portion of the tank 102 to detect the passage of paddles 111 near the sensor as the unloader rotates. Such a sensor would serve the same purpose as an unloader rotation sensor but with the additional ability to detect broken unloader arms and other mechanical problems.

Product weight may be measured via load cells when the product is deposited in or removed from the rocker treatment tank 100. For example, a belt scale 718 is shown in FIG. 7 for weighing product removed from treatment tank 100. Product surface temperature may be measured via infrared sensors when the product is deposited in or removed from the rocker treatment tank 100. For example, thermal sensor 720 is shown scanning product leaving treatment tank 100.

The tank 102 may have a cover system 116 which may include hoods 118 that may be opened to allow access to the interior of the tank for cleaning, maintenance and/or to observe operations. In some embodiments, the cover system 116 may be regarded as part of a safety system to protect workers from moving parts and other hazards within the rocker treatment tank 100. In such embodiments, it may be desirable to verify that the hoods 118 are closed as a condition for operating the treatment system. Components for verifying that the hoods 118 are closed may include monitoring devices installed proximate each hood 118 that change state when the hood 118 is closed. Monitoring devices may be limit switches, proximity switches, optical intrusion sensors or the like. In some embodiments, adjacent hoods 118 may be configured with overlapping elements that prevent a first hood 118 from closing before the adjacent hood 118 closes. In such embodiments, only the first hood 118 may need a closure monitor device.

An emergency stop switch or switches may be accessible from any location at which a person could be exposed to hazards associated with the treatment system and in particular hazards associated with movement of components of the treatment system.

The derivative parameters 1131 may include parameters that are calculated based upon process measurements 1130, control output values 1124, static factors 1121, the production schedule 1118, and/or other data. Non-limiting examples of derivative parameters 1131 may include dasher torque (in embodiments in which torque is not measured directly), product inventory in tank, unloading rate, treatment time, product loading density, product internal temperature, product yield, and agitation intensity.

A function to estimate dasher torque ($I_d$) on the dasher drive shaft 136 may take the form of equation 1 using independent parameters product inventory, characteristic treatment liquid level, agitation fluid flow and treatment liquid composition correction factor.

$$I_d=f_1(M,L,F_a,C_c) \qquad \text{(Equation 1)}$$

Product inventory in tank (M) may be measured or estimated at various times during treatment operations. As the rocker treatment tank 100 is being loaded with product at the start of operation and before the unloader is started, product load in the tank 102 can be calculated by integrating the infeed rate (e.g., pounds/$m_{in}$) over time. During operation, the mass of product in the tank 102 can be estimated based on the torque required to drive the dasher ($I_d$) while correcting for a number of other variables that impact torque.

Torque can also be measured directly as with strain gauges on a shaft and/or estimated from the operating parameters of the dasher drive motor such as motor voltage and amperage. Indeed, some motor controllers such as Variable Frequency Drives (VFD) provide an output signal proportional to the instantaneous torque produced by the motor. The output signal can be produced using readings from a sensor such as an internal sensor of the VFD. This allows estimation of product inventory in the tank at any time by inverting the torque function $f_1$ and comparing to the measured or estimated value of torque.

$$M=f_1^{-1}(I_d,L,F_a,C_c) \qquad \text{(Equation 2)}$$

The unloading rate ($m_{out}$) can be estimated in two ways: a mass accounting method (equation 3) based at least in part on product infeed rate and product inventory or by analysis of unloader motor power (equation 4) factoring characteristic unloader torque, unloader speed, characteristic liquid level and product loading density.

$$m_{out}=f_2(m_{in},M)=m_{in}+\Delta M/\Delta\text{time} \qquad \text{(Equation 3)}$$

$$\text{Alternatively, } m_{out}=f_3(I_u,S_u,L,d) \qquad \text{(Equation 4)}$$

The motor analysis method provides more precise and dynamic short-term estimates but is subject to cumulative error. The mass accounting method can be used to correct such cumulative error.

Treatment time (t) can be estimated. Rocker treatment tanks 100 do not preserve the sequence in which product is introduced into the tank. Consequently, there is a certain amount of variance in the treatment time of individual product units. The most likely (nominal or "average") treatment time of product being unloaded at any given moment can be estimated based on historical infeed and unloading rates since the start of operation as indicated in equation 5. Typically, these rates are intermittent—steady rates with occasional interruptions for worker breaks or breakdowns in upstream or downstream processing. However, some processors will speed up the steady rate to catch up from earlier unplanned interruptions.

$$t=f_4(m_{in},m_{out}) \qquad \text{(Equation 5)}$$

Product loading density (d) can be defined as product inventory in the tank divided by the geometric volume occupied by treatment liquid and product in the tank. As indicated in equation 6, loading density can be calculated from product inventory (M) and liquid level (L) given the fixed geometry of the rocker treatment tank 100.

$$d=f_5(M,L) \qquad \text{(Equation 6)}$$

Product internal temperature ($T_{pi}$) may be measured directly by piercing the product with a temperature probe. Placement of the probe is critical for measurement accuracy, and such a procedure is not well suited to automation. However, the internal temperature ($T_{pi}$) may be estimated based on a numerical model of the product in view of its historical exposure to treatment liquid and the conditions in the rocker treatment tank 100. Such a model may take the form of equation 7, where the independent parameters correspond to initial product temperature, tank temperature, residence time, dasher torque, dasher speed, agitation fluid flow, and product loading density. The model may be empirically based, and it may be updated periodically or continuously based at least in part on machine learning.

$$T_{pi}=f_6(T_i,T_t,t,I_d,S_d,F_a,d) \qquad \text{(Equation 7)}$$

Product yield (Y) is commonly defined as the weight of the finished product divided by the initial weight. Yield may be estimated based on a numerical model of the product in view of its historical exposure to treatment liquid and the conditions in the treatment tank. Such a model may take the form of equation 8, where the independent parameters correspond to initial product temperature, tank temperature, residence time, dasher torque, dasher speed, agitation air flow, and product loading density. The model may be empirically based, and it may be updated periodically or continuously based on machine learning. Yield may be determined as follows:

$$Y=f_7(T_i,T_r,t,I_d,S_d,F_a,d) \quad \text{(Equation 8)}$$

Agitation intensity (A) is a parameter indicating the general level of turbulence of the treatment liquid within the treatment tank. As indicated in equation 9, agitation intensity is largely driven by dynamic factors of dasher speed, agitation fluid flow rate, characteristic liquid level and product loading density. Agitation is also influenced by static factors including but not limited to dasher stroke length, agitation fluid type (e.g. water or air), treatment fluid properties (e.g. viscosity), and product properties (e.g. unit size and specific gravity). In some embodiments using air as the agitation fluid, agitation intensity may be controlled using a VFD to adjust the speed of the dasher motor 128 and the agitation flow control valve 154 to regulate the air supply to the air header 150 and the nozzles 208. In some implementations, agitation intensity may be substituted for an agitation fluid flow rate.

$$A=f_8(S_d,F_a,L,d) \quad \text{(Equation 9)}$$

The historical data 1133 may include historical values for production schedules 1118, static factors 1121, control output values 1124, performance metrics 1127, process measurements 1130, and derivative parameters 1131 for the same rocker treatment tank 100 or other rocker treatment tanks 100. The historical data 1133 may be used as training data for a machine learning algorithm used to generate the forecast model 1136 and/or to optimize the performance metrics 1127. Machine learning algorithms may involve linear regression, logistic regression, K-means clustering, gradient descent, and others.

The client device 1106 is representative of a plurality of client devices 1106 that may be coupled to the network 1109. The client device 1106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 1106 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 1106 may be configured to execute various applications such as a client application 1148 and/or other applications. The client application 1148 may be executed in a client device 1106, for example, to access network content served up by the computing environment 1103 and/or other servers, thereby rendering a user interface on the display. To this end, the client application 1148 may comprise, for example, a browser, a dedicated application, etc., and the user interface may comprise a network page, an application screen, etc. The client device 1106 may be configured to execute applications beyond the client application 1148 such as, for example, email applications, social networking applications, word processors, spreadsheets, and/or other applications.

Figure 12:
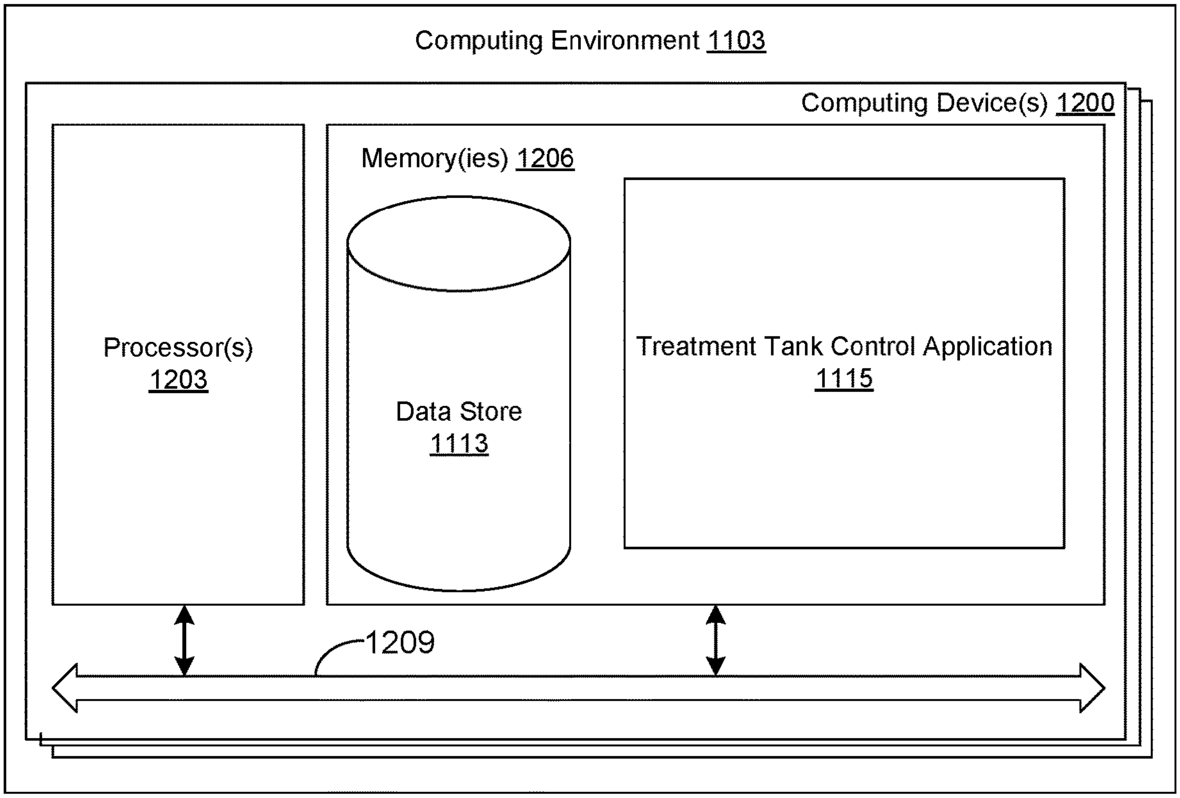
FIG. 12 is a schematic block diagram that provides one example illustration of a computing environment employed in the networked environment of FIG. 11 according to various embodiments of the present disclosure.

With reference to FIG. 12, shown is a schematic block diagram of the computing environment 1103 according to an embodiment of the present disclosure. The computing environment 1103 includes one or more computing devices 1200. Each computing device 1200 includes at least one processor circuit, for example, having a processor 1203 and a memory 1206, both of which are coupled to a local interface 1209. To this end, each computing device 1200 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the treatment tank control application 1115 and potentially other applications. Also stored in the memory 1206 may be a data store 1113 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and/or multiple processor cores and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the treatment tank control application 1115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the treatment tank control application 1115, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the treatment tank control application 1115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1200, or in multiple computing devices 1200 in the same computing environment 1103.

Figure 13:
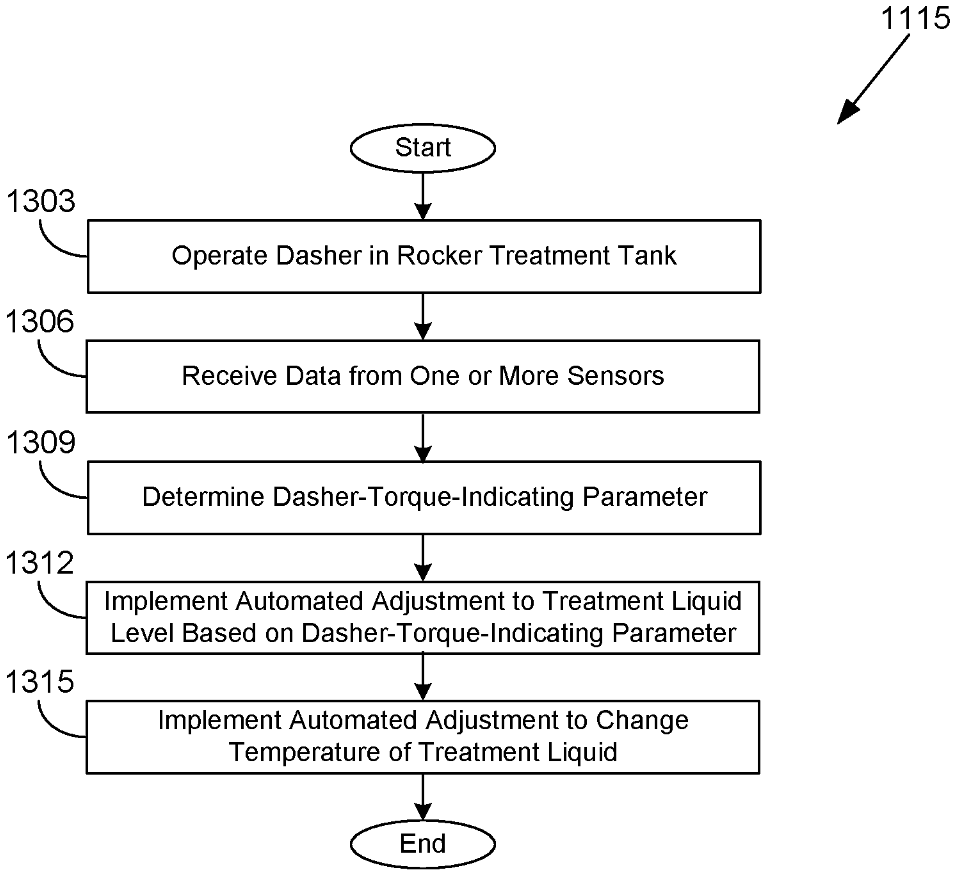
FIGS. 13-16 are flowcharts illustrating examples of functionality implemented as portions of a treatment tank control application executed in a computing environment in the networked environment of FIG. 11 according to various embodiments of the present disclosure.

Referring next to FIG. 13, shown is a flowchart that provides one example of the operation of a portion of the treatment tank control application 1115 according to various embodiments. It is understood that the flowchart of FIG. 13 provides merely an example of the many different types of functional arrangements that may be employed to implement the operation of the portion of the treatment tank control application 1115 as described herein. As an alternative, the flowchart of FIG. 13 may be viewed as depicting an example of elements of a method implemented in the computing environment 1103 (FIG. 11) according to one or more embodiments.

Beginning with box 1303, the treatment tank control application 1115 operates a dasher 104 in a rocker treatment tank 100. The dasher 104 oscillates within treatment liquid 106 in the rocker treatment tank 100. The dasher 104 comprises a dasher shaft 140, one or more dasher arms 124 coupled to the dasher shaft 140, and at least one dasher blade 122 coupled to the one or more dasher arms 124.

In box 1306, the treatment tank control application 1115 receives data from one or more sensors. One or more of the sensors are configured to provide data directly or indirectly indicating a torque transmitted to the dasher 104 to effect oscillation. In one example, the one or more sensors may include at least one strain gauge coupled to the dasher shaft 140 and which directly measures the torque transmitted to the dasher 104 to effect oscillation. In another example, the one or more sensors may include at least one current sensor that measures a drive motor current for the dasher 104. The sensors may include one or more sensors configured to directly or indirectly measure the level of the treatment liquid 106 in the rocker treatment tank 100 (e.g., liquid level sensors 164, level sensor 414). The sensors may include a dasher rotation sensor 163 that detects movement of the dasher shaft 140.

In box 1309, the treatment tank control application 1115 determines a dasher-torque-indicating parameter based at least in part on the data received from the one or more sensors. In various embodiments, the dasher-torque-indicating parameter may indicate at least one of: a peak torque value on a forward stroke of the dasher 104, a peak torque value on a reverse stroke of the dasher 104, an average torque value during a forward or reverse stroke of the dasher 104, a torque value as the dasher 104 passes a vertical position, or another torque value related to the dasher 104. In one embodiment, the dasher-torque-indicating parameter may be determined based at least in part on the drive motor current for motor 128 of the dasher 104.

In box 1312, the treatment tank control application 1115 implements an automated adjustment to the level of the treatment liquid 106 in the rocker treatment tank 100 based at least in part on the dasher-torque-indicating parameter. The liquid level adjustment can include a liquid filling action or a liquid draining action. A liquid filling action can include operating a treatment liquid controlling component such as a fill pump or a fill valve that adds treatment liquid 106 to the rocker treatment tank 100. The liquid draining or removal action can include operating a treatment liquid controlling component such as a drain pump or a drain valve that releases or removes treatment liquid 106 from the rocker treatment tank 100. The rocker treatment tank 100 can include a single treatment liquid controlling component that performs both actions, or different treatment liquid controlling components for the filling and removal actions. In one embodiment, the automated adjustment is implemented in response to the dasher-torque-indicating parameter meeting a threshold determined by a machine learning model. For example, a machine learning model may be trained based upon data describing optimized operation of the rocker treatment tank 100, and the machine learning model may yield a threshold for the dasher-torque-indicating parameter such that when the estimated dasher torque or a related parameter exceeds or falls beneath a threshold, the level of the treatment liquid 106 is automatically adjusted.

In order to determine the level of the treatment liquid 106 to be adjusted, the treatment tank control application 1115 may determine the current level of the treatment liquid 106 based on the data from the level-indicating sensors. In one example, a first liquid level sensor is on a first side of the rocker treatment tank 100, a second liquid level sensor is on a second side of the rocker treatment tank 100, and the treatment tank control application 1115 determines a characteristic level of the treatment liquid 106 based at least partially on the levels indicated by the first liquid level sensor and the second liquid level sensor (e.g., by performing an average or another calculation).

In box 1315, the treatment tank control application 1115 implements an automated adjustment to change a temperature of the treatment liquid 106. For example, the automated adjustment may be based at least in part on a measurement from a thermal sensor 720 of a product exiting the rocker treatment tank 100. In various embodiments, the automated adjustment may be effected by the treatment tank control application 1115 causing at least one of: a treatment liquid fill valve (e.g., liquid supply valve 620) or a drain valve 624 to open or close. Also, the automated adjustment may be effected by the treatment tank control application 1115 sending a control signal to a heat exchanger 614 to adjust the temperature of the treatment fluid 106 exiting the heat exchanger 614. Thereafter, the operation of the portion of the treatment tank control application 1115 ends.

Figure 14:
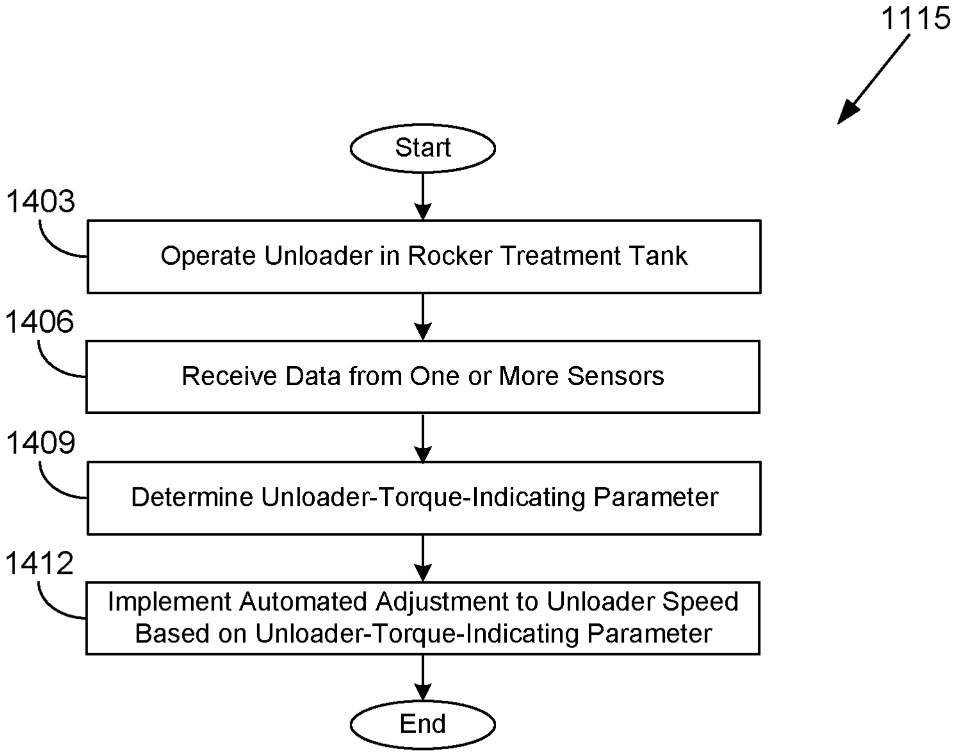

Referring next to FIG. 14, shown is a flowchart that provides one example of the operation of another portion of the treatment tank control application 1115 according to various embodiments. It is understood that the flowchart of FIG. 14 provides merely an example of the many different types of functional arrangements that may be employed to implement the operation of the portion of the treatment tank control application 1115 as described herein. As an alternative, the flowchart of FIG. 14 may be viewed as depicting an example of elements of a method implemented in the computing environment 1103 (FIG. 11) according to one or more embodiments.

Beginning with box 1403, the treatment tank control application 1115 operates an unloader 107 in a rocker treatment tank 100. The unloader 107 is operable to remove a product from the rocker treatment tank 100 in response to an application of a torque to a component of the unloader 107. For example, the unloader 107 may correspond to a windmill-type unloader 107 as in FIG. 1, a belt unloader 730 as in FIG. 7B, or another type of unloader. In one embodiment, the unloader 107 comprises one or more unloader paddles 111 that rotate with an unloader shaft 306 in order to lift the product in the treatment liquid 106 from a lifting position 110 to an unloading position 112, which can be proximate to a discharge chute 114. In another embodiment, the unloader 107 comprises a conveyor assembly 734 with a belt 736 that lifts the product above a level of the treatment liquid 106 and out of the rocker treatment tank 100. This can include a belt conveyor that extends from a lifting position 110 within the treatment tank to an unloading position 112.

In box 1406, the treatment tank control application 1115 receives data from one or more sensors (e.g., a strain gauge to directly measure torque, a current sensor to indirectly measure torque on a motor, etc.). The sensors are configured to provide data to indicate the torque applied to the component of the unloader 107. In box 1409, the treatment tank control application 1115 determines an unloader-torque-indicating parameter based at least in part on the data received from the one or more sensors. In box 1412, the treatment tank control application 1115 implements an automated adjustment to the speed of the unloader 107 based at least in part on the unloader-torque-indicating parameter. Thereafter, the operation of the portion of the treatment tank control application 1115 ends.

Figure 15:
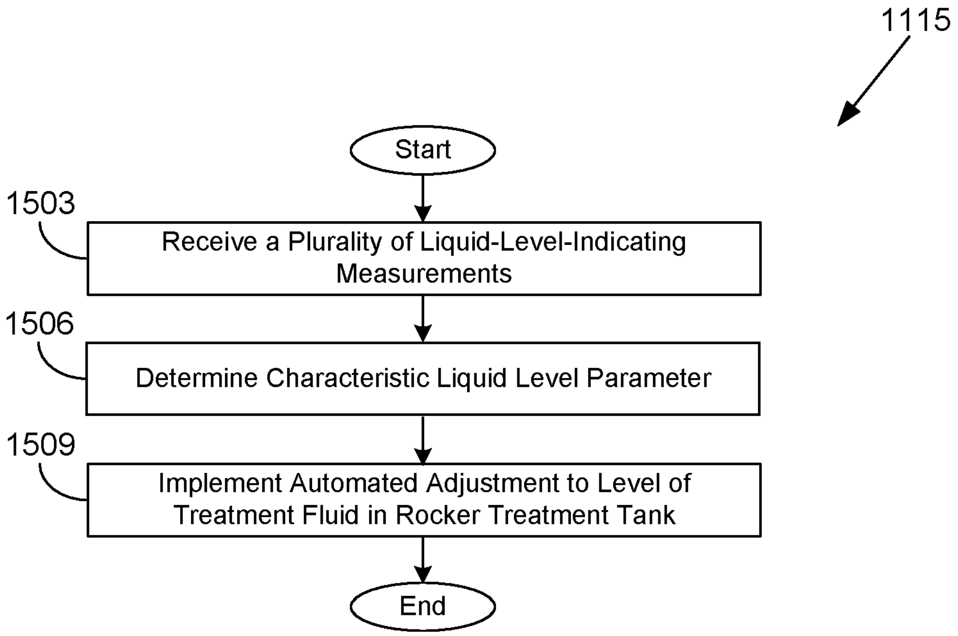

Referring next to FIG. 15, shown is a flowchart that provides one example of the operation of another portion of the treatment tank control application 1115 according to various embodiments. It is understood that the flowchart of FIG. 15 provides merely an example of the many different types of functional arrangements that may be employed to implement the operation of the portion of the treatment tank control application 1115 as described herein. As an alternative, the flowchart of FIG. 15 may be viewed as depicting an example of elements of a method implemented in the computing environment 1103 (FIG. 11) according to one or more embodiments.

Beginning with box 1503, the treatment tank control application 1115 receives a plurality of liquid-level-indicating measurements from a rocker treatment tank 100. In box 1506, the treatment tank control application 1115 determines a characteristic liquid level parameter based at least in part on the plurality of liquid-level-indicating measurements. For example, the treatment tank control application 1115 may average the plurality of liquid-level-indicating measurements. In one scenario, the measurements are from liquid level sensors located on opposite sides of the rocker treatment tank 100 (e.g., liquid level sensors 164, level sensor 414). In another scenario, the measurements are from a liquid level sensor at a location in the rocker treatment tank 100 over a full oscillation cycle of a dasher 104 in the rocker treatment tank 100. In another scenario, one or more of the measurements are obtained as an indirect measurement using a pressure sensor 409.

In box 1509, the treatment tank control application 1115 implements an automated adjustment to the level of the treatment fluid 106 in the rocker treatment tank 100. The automated adjustment to the level of the treatment fluid 106 may also be based at least in part on one or more of: a dasher-torque-indicating parameter or an unloader-torque-indicating parameter. For example, the dasher-torque-indicating parameter may be determined based at least in part on a dasher motor current utilization or a measurement from a strain gauge coupled to a dasher shaft 140, and the unloader-torque-indicating parameter may be based at least in part on an unloader motor current utilization or a measurement from a strain gauge coupled to an unloader shaft 306. The dasher-torque-indicating parameter, for example the dasher motor current utilization, can be identified by a sensor of a motor drive such as a variable frequency drive (VFD) for the dasher motor 128, where the sensor monitors parameters of the motor drive. The parameters of the drive can include frequency, voltage, current, and other parameters. The unloader-torque-indicating parameter, for example the unloader current utilization can also be identified by a sensor monitoring similar parameters of a VFD or other motor drive for an unloader motor. Thereafter, the operation of the portion of the treatment tank control application 1115 ends.

Figure 16:
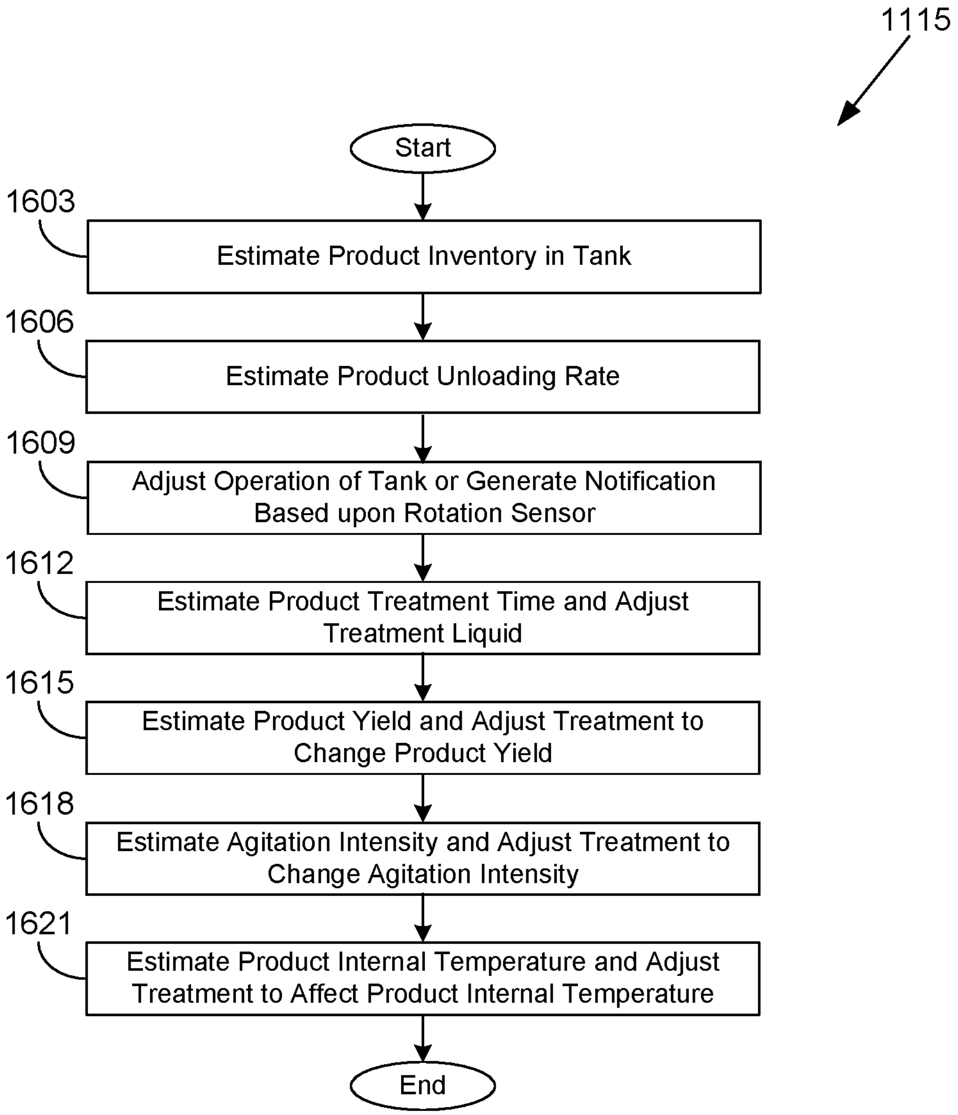

Referring next to FIG. 16, shown is a flowchart that provides one example of the operation of another portion of the treatment tank control application 1115 according to various embodiments. It is understood that the flowchart of FIG. 16 provides merely an example of the many different types of functional arrangements that may be employed to implement the operation of the portion of the treatment tank control application 1115 as described herein. As an alternative, the flowchart of FIG. 16 may be viewed as depicting an example of elements of a method implemented in the computing environment 1103 (FIG. 11) according to one or more embodiments.

Beginning with box 1603, the treatment tank control application 1115 estimates the product inventory in the rocker treatment tank 100. For example, the treatment tank control application 1115 may determine the infeed rate based upon an infeed sensor (e.g., that determines weight of product input using a load cell) and integrating the infeed rate over time. Alternatively, the mass of product in the tank 102 can be estimated based on the torque required to drive the dasher ($I_d$) while correcting for a number of other variables that impact torque.

In box 1606, the treatment tank control application 1115 estimates a product unloading rate for the rocker treatment tank 100. For example, the unloading rate ($m_{out}$) can be estimated in two ways: a mass accounting method (equation 3) based at least in part on product infeed rate and product inventory or by analysis of unloader motor power (equation 4) factoring characteristic unloader torque, unloader speed, characteristic liquid level and product loading density.

In box 1609, the treatment tank control application 1115 adjusts the operation of the rocker treatment tank 100 based at least in part on data reported by a rotation sensor (e.g., dasher rotation sensor 163, unloader rotation sensor 514). For example, a rotation speed meeting a threshold may indicate a mechanical problem for which the rocker treatment tank 100 operation should be suspended or otherwise adjusted.

In box 1612, the treatment tank control application 1115 estimates a product treatment time and adjusts the treatment liquid 106 (e.g., temperature, chemical composition) based at least in part on the product treatment time. The treatment time of product being unloaded at any given moment can be estimated based on historical infeed and unloading rates since the start of operation as indicated in equation 5.

In box 1615, the treatment tank control application 1115 estimates a product yield and adjusts product treatment (e.g., treatment time, temperature, dasher speed, unloader speed) via the rocker treatment tank 100 in order to change the product yield. The product yield may be estimated based on a numerical model of the product in view of its historical exposure to treatment liquid 106 and the conditions in the treatment tank. Such a model may take the form of equation 8, where the independent parameters correspond to initial product temperature, tank temperature, residence time, dasher torque, dasher speed, agitation air flow, and product loading density. The model may be empirically based, and it may be updated periodically or continuously based on machine learning.

In box 1618, the treatment tank control application 1115 estimates an agitation intensity and adjusts product treatment to change the agitation intensity. For example, agitation intensity may be estimated using equation 9. In some embodiments using air as the agitation fluid, agitation intensity may be controlled using a VFD to adjust the speed of the dasher motor 128 and the agitation flow control valve 154 to regulate the air supply to the air header 150 and the nozzles 208.

In box 1621, the treatment tank control application 1115 estimates a product internal temperature and adjusts product treatment (e.g., treatment time, tank temperature, dasher speed, unloader speed) to affect the product internal temperature. For example, the internal temperature ($T_{pi}$) may be estimated based on a numerical model of the product in view of its historical exposure to treatment liquid 106 and the conditions in the rocker treatment tank 100. Such a model may take the form of equation 7, where the independent parameters correspond to initial product temperature, tank temperature, residence time, dasher torque, dasher speed, agitation fluid flow, and product loading density. The model may be empirically based, and it may be updated periodically or continuously based at least in part on machine learning. Thereafter, the operation of the portion of the treatment tank control application 1115 ends.

The flowcharts of FIGS. 13-16 show the functionality and operation of an implementation of portions of the treatment tank control application 1115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts of FIGS. 13-16 show a specific order of execution, it is understood that the order of execution may differ from that which is depicted. For example, the order of execution of two or more blocks may be scrambled relative to the order shown. Also, two or more blocks shown in succession in FIGS. 13-16 may be executed concurrently or with partial concurrence. Further, in some embodiments, one or more of the blocks shown in FIGS. 13-16 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A rocker treatment tank, comprising:

a dasher configured to oscillate within the rocker treatment tank, the dasher comprising a dasher shaft, one or more dasher arms coupled to the dasher shaft, and at least one dasher blade coupled to the one or more dasher arms;

one or more sensors configured to provide data directly or indirectly indicating a torque transmitted to the dasher to effect oscillation; and at least one processor configured to at least:

determine a value of a dasher-torque-indicating parameter based at least in part on the data received from the one or more sensors; and implement an automated liquid level adjustment that controls at least one treatment-liquid-controlling component comprising one or both of a valve and a pump, and based at least in part on the value of the dasher-torque-indicating parameter.

2. The rocker treatment tank of claim 1, wherein the one or more sensors includes at least one strain gauge coupled to at least one of a dasher drive shaft or the dasher shaft, and which directly measures the torque transmitted to the dasher to effect oscillation.

3. The rocker treatment tank of claim 1, wherein the one or more sensors includes at least one sensor that measures a drive motor current for the dasher, and the value of the dasher-torque-indicating parameter is determined based at least in part on the drive motor current for the dasher.

4. The rocker treatment tank of claim 1, wherein the value of the dasher-torque-indicating parameter indicates at least one of: a peak value on a forward stroke of the dasher, a peak value on a reverse stroke of the dasher, an average value during a forward or reverse stroke of the dasher, or a value as the dasher passes a vertical position.

5. The rocker treatment tank of claim 1, wherein the automated liquid level adjustment is implemented in response to the value of the dasher-torque-indicating parameter meeting a threshold determined by a machine learning model.

6. The rocker treatment tank of claim 1, further comprising a sensor configured to directly measure a treatment liquid level value for the rocker treatment tank.

7. The rocker treatment tank of claim 1, further comprising a pressure sensor configured to indirectly measure a treatment liquid level value for the rocker treatment tank.

8. The rocker treatment tank of claim 1, further comprising a first liquid level sensor on a first side of the rocker treatment tank, a second liquid level sensor on an opposite side of the rocker treatment tank, and the at least one processor is further configured to determine a value of a characteristic level based at least partially on the levels indicated by the first liquid level sensor and the second liquid level sensor.

9. The rocker treatment tank of claim 1, further comprising a dasher rotation sensor that detects movement of the dasher shaft.

10. The rocker treatment tank of claim 1, wherein the at least one processor is further configured to at least implement an automated temperature adjustment to change a temperature of the treatment liquid based at least in part on a measurement from a thermal sensor of a product exiting the rocker treatment tank, wherein the processor is configured to receive the measurement from the thermal sensor of the product exiting the rocker treatment tank and implement the automated temperature adjustment to change the temperature of the treatment liquid by causing at least one of:

a treatment liquid fill valve or a drain valve to open or close; and adjusting the temperature of the treatment liquid exiting the heat exchanger.

11. The rocker treatment tank of claim 1, wherein the automated liquid level adjustment is effected by opening or closing the at least one treatment-liquid controlling component comprises the valve, wherein the valve is at least one of a treatment liquid fill valve or a drain valve.

12. A rocker treatment tank, comprising:

an unloader comprising a rotating component arranged to transport a product from the rocker treatment tank, the unloader being configured to operate within the rocker treatment tank in response to an application of a torque to the rotating component of the unloader;

one or more sensors configured to provide data to indicate the torque; and at least one processor configured to at least:

determine a value of an unloader-torque-indicating parameter based at least in part on the data received from the one or more sensors; and implement an automated adjustment to a speed of the unloader based at least in part on the unloader-torque-indicating parameter.

13. The rocker treatment tank of claim 12, wherein the rotating component comprises an unloader shaft, and the rotating component of the unloader comprises one or more unloader paddles that rotate with the unloader shaft in order to move from a lifting position to an unloading position proximate to a discharge chute.

14. The rocker treatment tank of claim 12, wherein the rotating component of the unloader comprises a belt conveyor that extends from a lifting position within the treatment tank to an unloading position.

15. A method for adjusting a treatment liquid level in a rocker treatment tank, the method comprising:

determining a value of a characteristic liquid-level parameter based at least in part on a liquid-level-indicating measurement; and implementing an automated liquid level adjustment in the rocker treatment tank as a function of the value of the characteristic liquid level parameter and the value of at least one of: a dasher-torque-indicating parameter or an unloader-torque-indicating parameter.

16. The method of claim 15, wherein the liquid-level-indicating measurement includes a first liquid-level-indicating measurement and a second liquid-level-indicating measurement, and the method further comprises:

determining the first liquid-level-indicating measurement based at least in part on a first sensor value from a first liquid level sensor on a first side of the rocker treatment tank; and determining the second liquid-level-indicating measurement based at least in part on a second sensor value from a second liquid level sensor on an opposite side of the rocker treatment tank.

17. The method of claim 15, wherein determining a value of a characteristic liquid level parameter further comprises averaging the value of the liquid-level indicating measurement from a liquid level sensor at a location in the rocker treatment tank over a full oscillation cycle of a dasher in the rocker treatment tank.

18. The method of claim 15, wherein the liquid-level-indicating measurement is measured indirectly using a pressure sensor.

19. The method of claim 15, further comprising at least one of:

determining the dasher-torque-indicating parameter based at least in part on a dasher motor current utilization; or determining the unloader-torque-indicating parameter based at least in part on an unloader motor current utilization.

20. The method of claim 15, further comprising at least one of:

determining the dasher-torque-indicating parameter based at least in part on a measurement from a first strain gauge coupled to a dasher shaft comprising a dasher drive shaft; or determining the unloader-torque-indicating parameter based at least in part on a measurement from a second strain gauge coupled to an unloader shaft.

* * * * *